United States Patent
Racz et al.

(10) Patent No.: US 11,412,656 B2
(45) Date of Patent: Aug. 16, 2022

(54) TRIMMER HEAD WITH IMPROVED LINE RELEASE FEATURE

(71) Applicant: HUSQVARNA AB, Huskvarna (SE)

(72) Inventors: Joseph Racz, Gastonia, NC (US); Michael Wright, Concord, NC (US)

(73) Assignee: HUSQVARNA AB, Huskvarna (SE)

( * ) Notice: Subject to any disclaimer, the term of this patent is extended or adjusted under 35 U.S.C. 154(b) by 8 days.

(21) Appl. No.: 16/768,114

(22) PCT Filed: Nov. 19, 2018

(86) PCT No.: PCT/EP2018/081806
§ 371 (c)(1),
(2) Date: May 29, 2020

(87) PCT Pub. No.: WO2019/105789
PCT Pub. Date: Jun. 6, 2019

(65) Prior Publication Data
US 2020/0315089 A1    Oct. 8, 2020

Related U.S. Application Data

(60) Provisional application No. 62/593,086, filed on Nov. 30, 2017.

(51) Int. Cl.
*A01D 34/416* (2006.01)

(52) U.S. Cl.
CPC ................... *A01D 34/4163* (2013.01)

(58) Field of Classification Search
CPC ............. A01D 34/4163; A01D 34/416; A01D 34/4161; A01D 34/4165
USPC .................... 30/276, 347; 56/12.7, 294, 295
See application file for complete search history.

(56) References Cited

U.S. PATENT DOCUMENTS

| 3,708,967 A | 1/1973 | Geist et al. |
| 4,068,377 A | 1/1978 | Kimmel et al. |
| 4,137,694 A | 2/1979 | Hopper |
| 4,242,797 A | 1/1981 | Palmieri et al. |

(Continued)

FOREIGN PATENT DOCUMENTS

| AU | 2007315691 B2 | 10/2012 |
| AU | 2014353024 A1 | 6/2016 |

(Continued)

OTHER PUBLICATIONS

International Search Report and Written Opinion for International Application No. PCT/EP2018/081806 dated Feb. 11, 2019.

*Primary Examiner* — Phong H Nguyen
(74) *Attorney, Agent, or Firm* — Burr & Forman LLP

(57) ABSTRACT

A trimmer head of a hand-held cutting device may include a spool onto which trimmer line is loadable and from which the trimmer line is dispensable, a housing including a first housing portion and a second housing portion operably coupled to the first housing portion to house the spool where the housing is driven rotationally about an axis by a shaft during powered operation of the device, a coupling assembly configured to selectively couple the spool to and decouple the spool from the housing during powered operation of the device based on an axial position of the coupling assembly within the housing, and a button operably coupled to the coupling assembly to alter the axial position of the coupling assembly when the button is moved out of a rest position by a bump of the button on a surface.

20 Claims, 14 Drawing Sheets

(56) References Cited

U.S. PATENT DOCUMENTS

| | | | |
|---|---|---|---|
| 5,020,223 A | 6/1991 | Desent et al. |
| 5,659,960 A | 8/1997 | Everts et al. |
| 5,806,192 A | 9/1998 | Everts et al. |
| 5,836,227 A | 11/1998 | Dees, Jr. et al. |
| 6,108,914 A | 8/2000 | Sheldon |
| 6,263,580 B1 | 7/2001 | Stark et al. |
| 6,581,292 B2 | 6/2003 | Allis |
| 6,742,263 B2 | 6/2004 | Ellson et al. |
| 6,851,191 B2 | 2/2005 | Arnetoli |
| 6,944,954 B1 | 9/2005 | Arnetoli |
| 6,952,877 B2 | 10/2005 | Pfaltzgraff |
| 7,000,324 B2 | 2/2006 | Fogle |
| 7,111,403 B2 | 9/2006 | Moore |
| 7,275,324 B2 | 10/2007 | Proulx |
| 7,406,771 B2 | 8/2008 | Zimmermann et al. |
| 7,412,768 B2 | 8/2008 | Alliss |
| 7,536,792 B2 | 5/2009 | Moore |
| 7,607,232 B2 | 10/2009 | Pfaltzgraff |
| 7,836,602 B2 | 11/2010 | Langhans et al. |
| 7,979,991 B2 | 7/2011 | Pfaltzgraff |
| 8,001,694 B2 | 8/2011 | Sing et al. |
| 8,025,249 B2 | 9/2011 | Alliss et al. |
| 8,230,602 B2 | 7/2012 | Arnetoli |
| 8,266,805 B1 | 9/2012 | Alliss |
| 8,307,558 B2 | 11/2012 | Alliss |
| 8,510,960 B2 | 8/2013 | Pfaltzgraff et al. |
| 8,567,074 B2 | 10/2013 | Arnetoli |
| 8,745,879 B2 | 6/2014 | Alliss |
| 8,745,880 B2 | 6/2014 | Kato |
| 8,863,395 B2 | 10/2014 | Alliss |
| 8,910,387 B2 | 12/2014 | Alliss |
| 9,144,194 B2 | 9/2015 | Kato |
| 9,253,942 B2 | 2/2016 | Alliss et al. |
| 9,295,195 B2 | 3/2016 | Proulx et al. |
| 9,380,743 B2 | 7/2016 | Alliss |
| 9,516,807 B2 | 12/2016 | Alliss |
| 2002/0189107 A1 | 12/2002 | Arnetoli |
| 2003/0033718 A1 | 2/2003 | Alliss |
| 2008/0120847 A1 | 5/2008 | Alliss |
| 2010/0050584 A1 | 3/2010 | Whitehead |
| 2011/0225832 A1 | 9/2011 | Alliss |
| 2011/0302793 A1 | 12/2011 | Alliss |
| 2015/0271992 A1 | 10/2015 | Nagoshi |
| 2016/0183452 A1 | 6/2016 | Kullberg |

FOREIGN PATENT DOCUMENTS

| | | |
|---|---|---|
| CA | 2454835 A1 | 2/2003 |
| CA | 2456885 C | 5/2010 |
| CN | 101473728 A | 7/2009 |
| CN | 101553107 A | 10/2009 |
| CN | 101677509 A | 3/2010 |
| CN | 105027809 A | 11/2015 |
| CN | 205408565 U | 8/2016 |
| CN | 105934147 A | 9/2016 |
| CN | 107148839 A | 9/2017 |
| CN | 108135129 A | 6/2018 |
| DE | 60210983 T2 | 5/2007 |
| EP | 0271762 A1 | 6/1988 |
| EP | 1416786 B1 | 4/2006 |
| EP | 1894459 A1 | 3/2008 |
| EP | 2186391 A1 | 5/2010 |
| EP | 1670305 B1 | 4/2011 |
| EP | 2380424 A1 | 10/2011 |
| EP | 2923549 A1 | 9/2015 |
| EP | 2825017 A4 | 5/2016 |
| EP | 3056075 A1 | 8/2016 |
| GB | 1270072 A | 4/1972 |
| KR | 20110088341 A | 8/2011 |
| WO | 2008053508 A2 | 5/2008 |
| WO | 2009067184 A2 | 5/2009 |
| WO | 2013138752 A1 | 9/2013 |
| ZA | 200401017 B | 5/2005 |
| ZA | 200601777 B | 7/2007 |

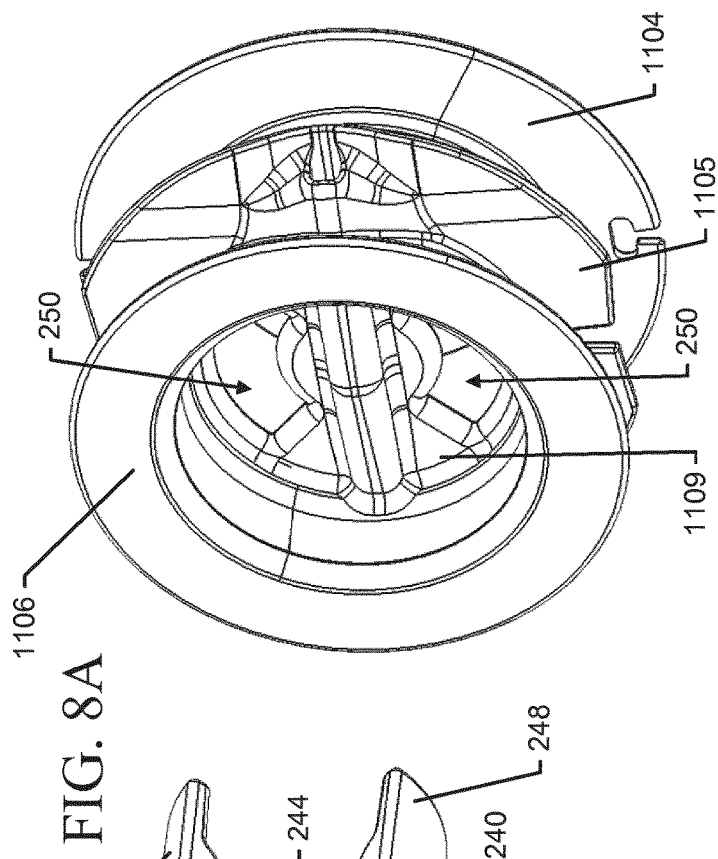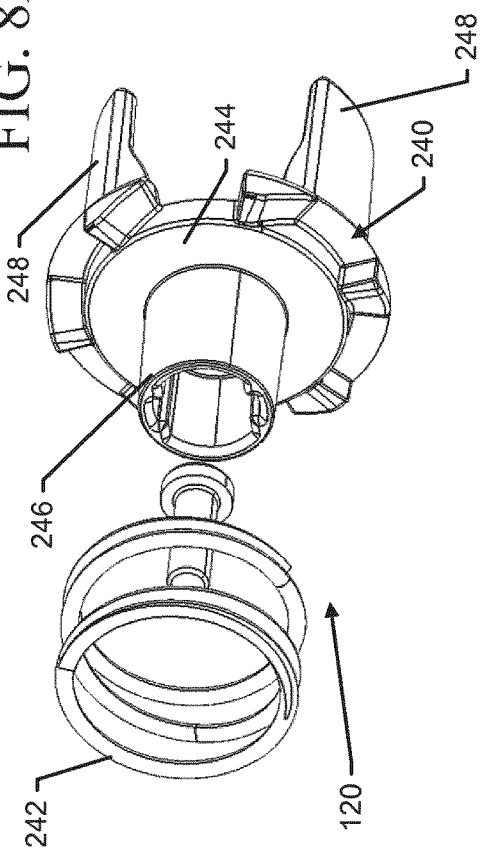

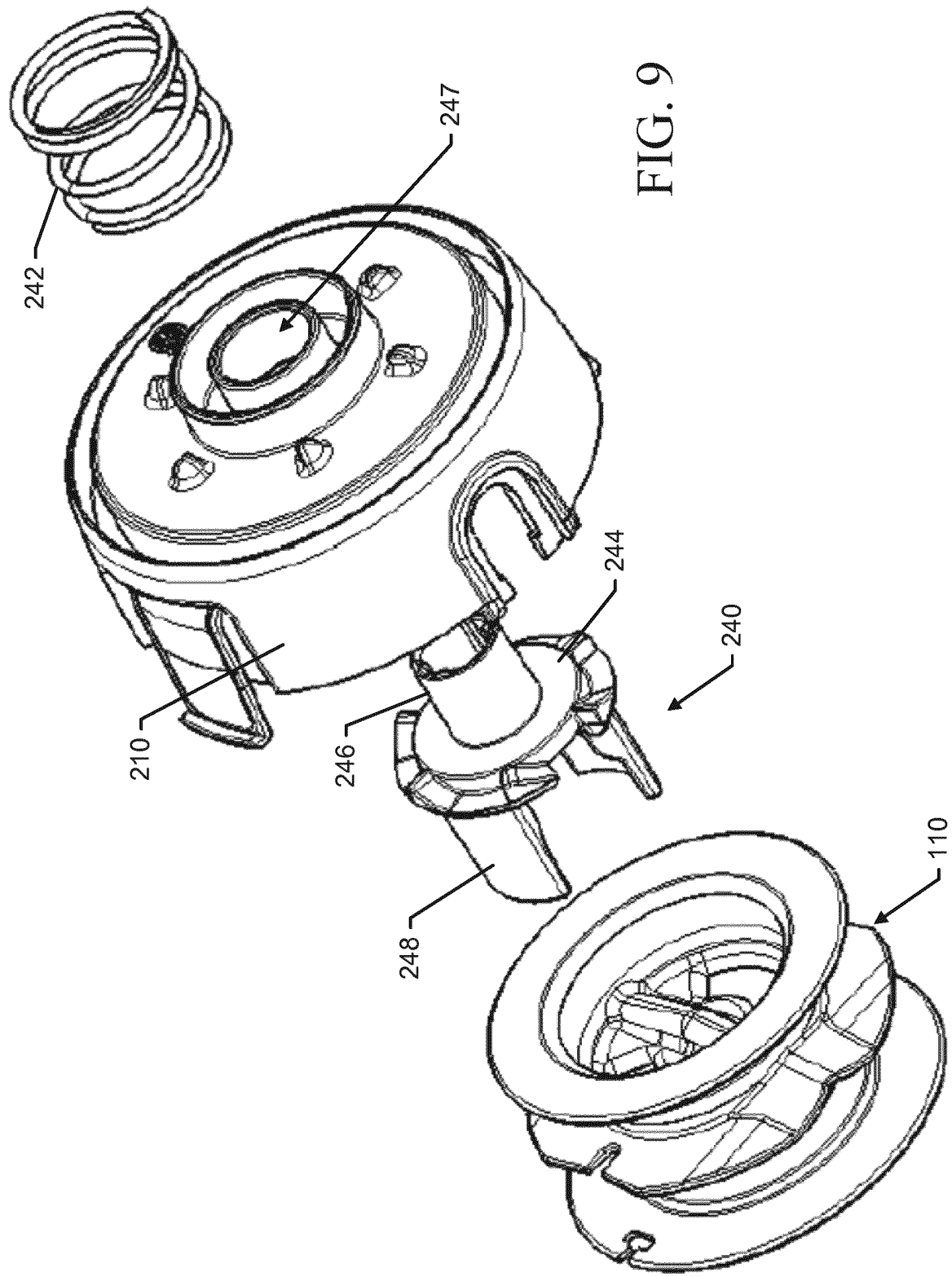

TRIMMER HEAD WITH IMPROVED LINE RELEASE FEATURE

TECHNICAL FIELD

Example embodiments generally relate to an outdoor power device that employs trimmer line and, more particularly, relate to a mechanism for providing relatively easy release of trimmer line by bumping the case of the trimmer head.

BACKGROUND

Handheld outdoor power devices such as trimmers, blowers, chainsaws, and/or the like, are often used to perform tasks relating to yard/grounds maintenance or even commercial resource harvesting activities that require them to be mobile. Although there are several options for powering such devices, including combustion engines, corded electric motors, or battery powered electric motors, each option may be viewed as having advantages in certain environments and for certain users.

Some trimming devices employ a trimmer line and are referred to as string trimmers. Alternatively, such devices may be known as edge trimmers, line trimmers, weed whips and/or the like. The trimmer line, which may be a monofilament line, is quite effective at cutting when rotated at high speed. Such a trimmer line is extended and held somewhat rigid by centrifugal forces while being rotated. In some cases, the trimmer line is wound upon a reel or spool and the trimmer line can be released by bumping the trimmer head on the ground during operation. Meanwhile, the trimmer line is generally loaded into the trimmer head via partial disassembly of the trimmer head to gain access to a spool or core member. Thereafter, the trimmer line is manually wound about the spool or core member and the trimmer head is then re-assembled with the loaded spool installed. The method of releasing trimmer line by bumping the trimmer head on the ground during operation is common practice. As trimmer line is expended during the course of operation, the operator may find it frustrating and/or difficult to disassemble the trimmer head in order to manually reload/rewind trimmer line to the core member. Accordingly, it may be desirable to define improved structures for allowing easy release and loading of trimmer line that are also robust.

BRIEF SUMMARY OF SOME EXAMPLES

Some example embodiments may therefore provide a trimmer device that can accommodate a structure that is relatively quick and easy to load with trimmer line.

In one example embodiment, a trimmer head for a handheld cutting device is provided. The trimmer head may include a spool onto which trimmer line is loadable and from which the trimmer line is dispensable, a housing including a first housing portion and a second housing portion operably coupled to the first housing portion to house the spool where the housing is driven rotationally about an axis by a shaft during powered operation of the device, a coupling assembly configured to selectively couple the spool to and decouple the spool from the housing during powered operation of the device based on an axial position of the coupling assembly within the housing, and a button operably coupled to the coupling assembly to alter the axial position of the coupling assembly when the button is moved out of a rest position by a bump of the button on a surface.

In another example embodiment, a hand-held cutting device is provided. The device may include an elongated member graspable along a portion thereof by an operator, a trimmer head disposed at one end of the elongated member and configured to be rotatable to perform a cutting function using trimmer line held at a portion of the trimmer head, and a power unit operably coupled to the trimmer head to selectively cause rotation of the trimmer head via turning a shaft. The trimmer head may include a spool onto which trimmer line is loadable and from which the trimmer line is dispensable, a housing including a first housing portion and a second housing portion operably coupled to the first housing portion to house the spool where the housing is driven rotationally about an axis by a shaft during powered operation of the device, a coupling assembly configured to selectively couple the spool to and decouple the spool from the housing during powered operation of the device based on an axial position of the coupling assembly within the housing, and a button operably coupled to the coupling assembly to alter the axial position of the coupling assembly when the button is moved out of a rest position by a bump of the button on a surface.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 8A illustrates an exploded view of the spool and coupling assembly in isolation in accordance with an example embodiment;

FIG. 8B illustrates a perspective view of the spool and coupling assembly in isolation, but assembled together, in accordance with an example embodiment;

FIG. 9 illustrates an exploded perspective view of the spool, the coupling assembly and the cup in accordance with an example embodiment;

DETAILED DESCRIPTION

Figure 1:
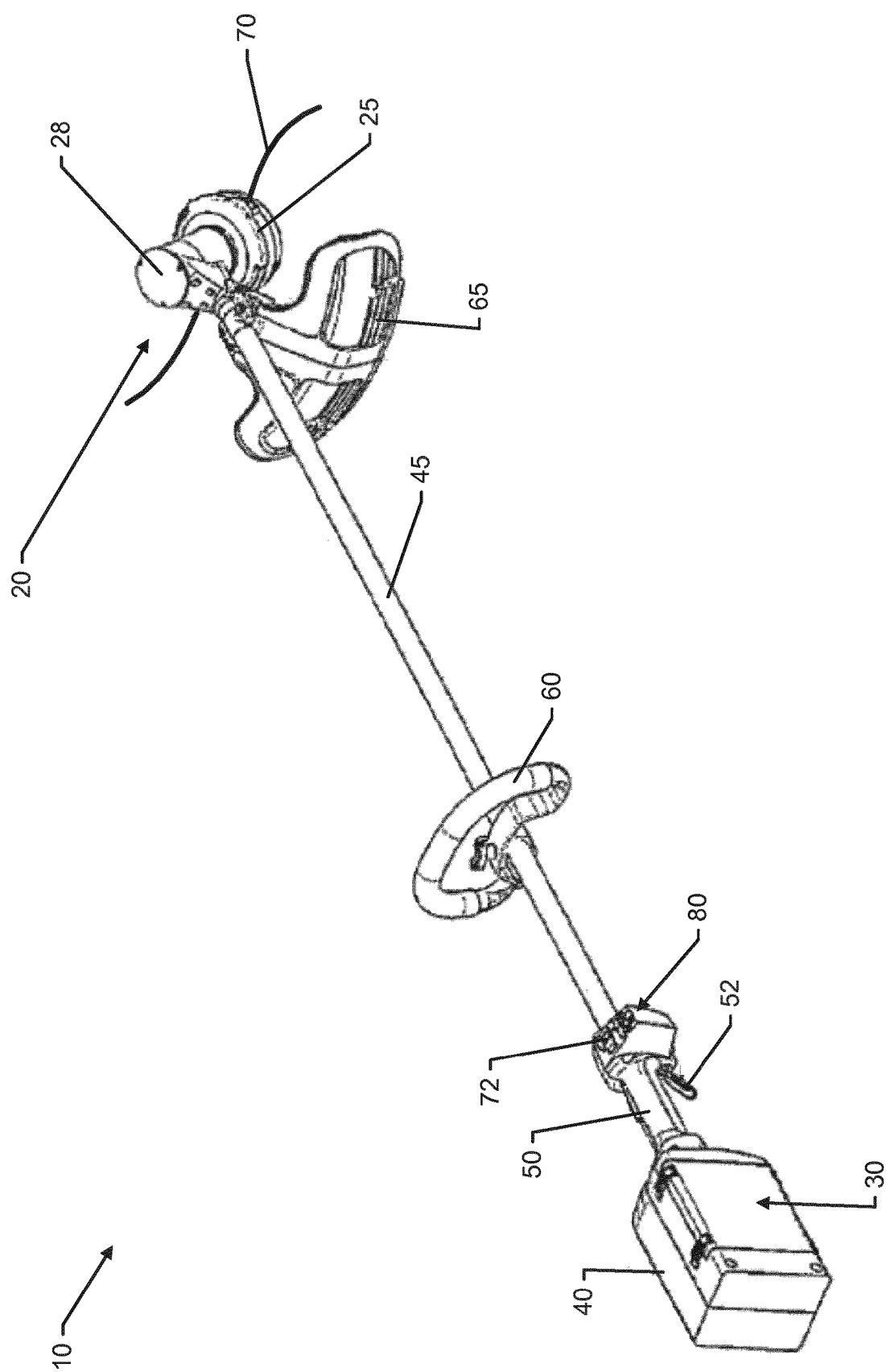
FIG. 1 illustrates a perspective view of an electric powered trimmer that may be configured in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other. One of skill in the art will appreciate that the normal position in which devices of example embodiments are held for operation of the working assembly represents the front of such devices. All other directional references should be understood in this general context.

Some example embodiments described herein provide a line holding assembly that can be easily molded and assembled, and that allows an operator to quickly and easily release trimmer line, and load trimmer line onto a trimmer head. In particular, some example embodiments provide a line holding assembly in which the housing of the trimmer head is configured to be continuously driven, and the spool on which the trimmer line is loaded is operably coupled to the housing in such a way as to be biased for continuous driving with the housing (during powered operation) except during a bump operation. Thus, for example, the spool and the housing are maintained in registration with each other (i.e., having a fixed orientation relative to one another) until the bump operation occurs. When the bump operation (or simply bump) is experienced, the spool is temporarily decoupled from the housing to permit relative movement therebetween. The temporary decoupling of the housing and spool allows the spool to slow or stop while the housing continues to be driven, and the relative motion between spool and housing. The relative motion is in a direction opposite the winding direction of the trimmer line on the spool and therefore causes trimmer line to be drawn off the spool and dispensed outwardly from the housing to extend the usable trimmer line for cutting operations. The coupling and decoupling of the spool and housing is accomplished without any movement of the spool or housing in the axial direction. Instead, a coupling assembly is provided to move axially with the bump and provide for the coupling/decoupling between the housing and spool without any axial movement of the spool or housing. Thus, the spool and housing are always maintained in the same axial alignment during powered operation of the trimmer head, but are allowed to selectively change their relative rotational alignment to release trimmer line responsive to axial movement of the coupling assembly during powered operation and by manually changing their relative rotational alignment during loading of the trimmer line when not being powered.

Referring to the drawings, FIG. 1 shows an electric, battery powered trimmer 10 that may be configured in accordance with an example embodiment. However, it should be appreciated that the trimmer 10 is merely one example of an outdoor power device that may be configured in accordance with an example embodiment. Example embodiments could alternatively be employed in connection with corded versions of various electric powered, outdoor power devices. Moreover, in some cases, example embodiments could also be practiced in connection with combustion engines that are configured to turn an output shaft. Thus, although an example embodiment will be described hereinafter with specific reference to the trimmer 10 of FIG. 1, the applicability of alternative embodiments relative to other types of devices should be well understood. Additionally, the specific functions and structures of the trimmer 10 shown in FIG. 1 could be altered in other examples without departing from the scope of example embodiments.

As shown in FIG. 1, the trimmer 10 may include a working implement or working assembly 20, which in this example includes a rotatable trimmer head 25. The working assembly 20 may further include a motor (e.g., an electric motor) disposed in a drive housing 28 of the working assembly 20. However, for gas powered embodiments and for some electrically powered embodiments, the motor is often disposed remotely with respect to the trimmer head 25, and power is transferred to the trimmer head 25 via couplings provided in the drive housing 28. The motor of the trimmer 10 may be powered, according to this example, by a battery pack 30. The battery pack 30 may take any of numerous possible forms, and may be received into a battery compartment (also capable of taking different forms) of the trimmer 10. It should be appreciated that the battery pack 30 and/or motor of this example form a power unit that can turn the working assembly 20. However, in other examples, the power unit may include a combustion engine or other suitable power source.

The battery compartment may be a recess or cavity formed in a casing 40 of the trimmer 10 disposed at one end of an elongated member 45 that may further include the working assembly 20 at an opposite end thereof (i.e., the front end). The elongated member 45 may be a hollow tube, pipe, rod or other such member that may be straight or curved in different embodiments. The elongated member 45 may provide operable communication between the working assembly 20 and the battery pack 30 so that the battery pack 30 can power the working assembly 20. In some embodiments, the casing 40 may be formed from one or more plastic or other rigid components that may be molded to have a desired shape. The casing 40 may substantially enclose the battery compartment, control circuitry and/or other components associated with powering and/or controlling the operation of the trimmer 10. However, it should also be appreciated that the battery pack of some alternative embodiments may be housed within a backpack that may be worn on the operator's back. In such an example, the battery pack may be connected to the trimmer 10 via a cord or other adaptor.

In an example embodiment, the trimmer 10 may include a rear handle 50 and a front handle 60. The rear handle 50 may, in some cases, be disposed in-line with the elongated member 45 proximate to the casing 40, while the front handle 60 may be disposed between the casing 40 and the working assembly 20 at an intermediate portion of the elongated member 45. An operator of the trimmer 10 may use one hand to hold the front handle 60 and the other hand to hold the rear handle 50 while operating the trimmer 10. In some embodiments, the rear handle 50 may include a trigger 52 or other control mechanism for engaging operation of the motor to power the working assembly 20. However, the trigger 52 could be located at the front handle 60 in other examples, and the front and rear handles 60 and 50 could take different forms and be provided in different positions in other cases. In this regard, for example, although FIG. 1 shows the front handle 60 being positioned forward of the rear handle 50 along the elongated member 45, it should also be appreciated that other arrangements for holding and operating the trimmer 10 may be provided. For example, in some cases, a "handlebar" embodiment may be provided in which the front and rear handles 60/50 are replaced by a single handle assembly attached to the elongated member 45 where both handles on the handle assembly are substantially equidistant from the working assembly 20 and disposed spaced apart from the elongated member 45 on opposites sides thereof on a handlebar assembly. Other arrangements are also possible.

The trimmer 10 may further employ a trim shield 65 that is configured to prevent cut materials and/or debris from coming back at the operator. The operator may actuate the trigger 52 to power the working assembly and turn the trimmer head 25. The trimmer head 25 may include trimmer line 70 that may extend outwardly (e.g., in a radial direction relative to a drive shaft forming an axis about which the trimmer head 25 rotates) from the trimmer head 25 to cut vegetation encountered thereby. The trim shield 65 may employ at least one knife element (not shown) to cut the trimmer line 70 to a length slightly less than the distance from the external periphery of the trimmer head 25 to the internal periphery of the trim shield 65 responsive to rotation of the trimmer head 25.

In an example embodiment, the motor may be a DC motor or a brushless DC motor (BLDC) that is powered by the battery pack 30. The motor may be configured to turn in either the clockwise or counterclockwise direction when a power switch 72 is powered on. In the example of FIG. 1, the power switch 72 may be provided at a control panel or control assembly 80 that may be positioned proximate to the rear handle 50. However, the control assembly 80 could be positioned at any of a number of other locations on the trimmer 10 in alternative embodiments. Moreover, it should be appreciated that gasoline powered embodiments may replace the trigger 52 with a throttle and may replace the battery pack with a gasoline engine. The general structure, however, of even such gasoline powered embodiments may generally be similar and, as indicated above, the power unit may therefore be electric or gas powered.

The rotation of the trimmer head 25 may cause the trimmer line 70 (which may be monofilament line) to stiffen extensively based on centrifugal forces applied to the trimmer line 70 during rotation. The faster the rotation, the stiffer the trimmer line 70 generally becomes. The trimmer line 70 can therefore make a good cutting tool for the cutting or trimming of most vegetation that is not substantially woody. However, it is typically inevitable that the trimmer line 70 will be worn during use. The wearing forces acting on the trimmer line 70 may cause the line to break, abrade or otherwise shorten in length over time. To re-extend the trimmer line 70 to full length, the trimmer head 25 may be "bumped" on the ground to release more trimmer line 70 (and cut it to length, if appropriate).

To provide sufficient additional trimmer line 70 to allow the "bump" operation to release line, the trimmer head 25 may be provided with a trimmer line spool upon which extra trimmer line 70 may be wound. However, even this spool would eventually run out of trimmer line 70 over time and need replenishment. In the past, the winding of more trimmer line 70 onto the spool has required some level of disassembly of the trimmer head 25. This disassembly and winding of trimmer line 70 can be cumbersome, and may be difficult to accomplish in a quick and easy manner. Accordingly, some example embodiments have been provided to improve the capability of the operator to easily and quickly release trimmer line 70 from, and replenish trimmer line 70 onto, the trimmer head 25.

As discussed above, the bump operation or bump may cause axial movement of only some components of the trimmer head 25. In this regard, some portions of the trimmer head 25 may retain their axial positions/orientations through the bump, while others (e.g., the coupling assembly) move axially to enable relative motion rotationally about the axis of rotation of the trimmer head 25 between the spool and housing of the trimmer head 25 as described in greater detail below.

Figure 2A:
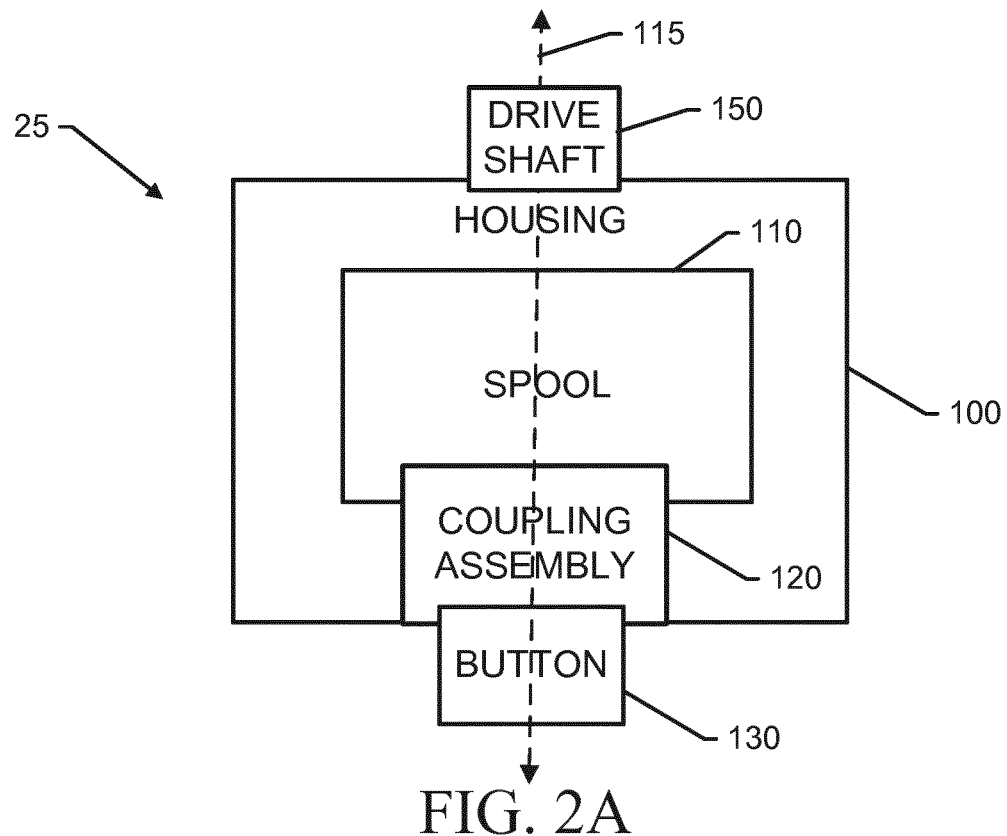
FIG. 2A illustrates a conceptual block diagram of a trimmer head in a normal operating position in accordance with an example embodiment.
Figure 2B:
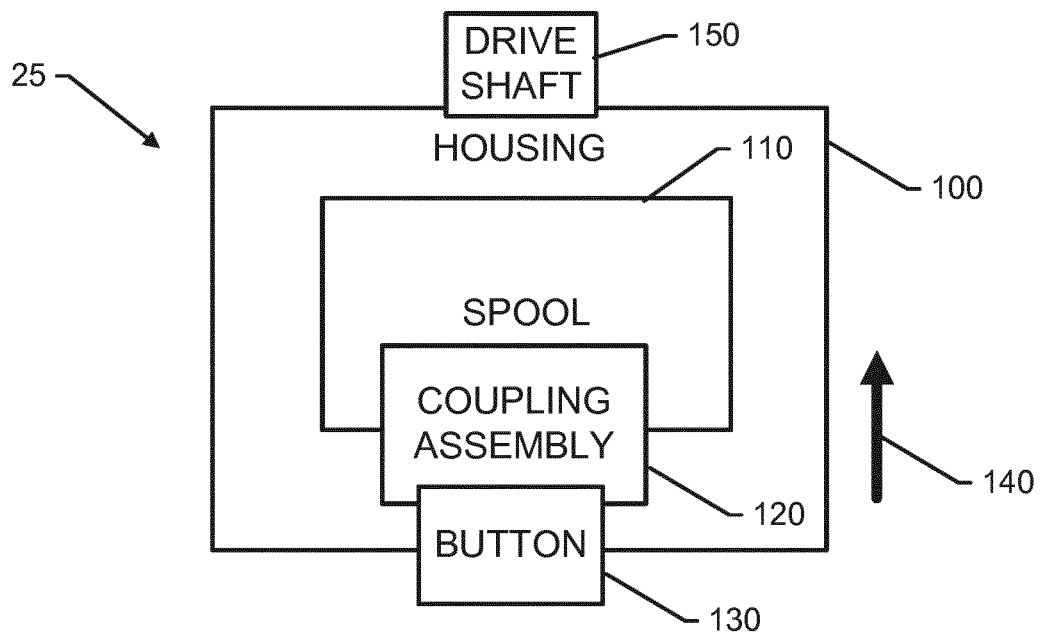
FIG. 2B illustrates a conceptual block diagram of the trimmer head during a bump operation in accordance with an example embodiment.

FIG. 2, which is defined by FIGS. 2A and 2B, illustrates a functional block diagram of the trimmer head 25 of an example embodiment. In this regard, FIG. 2A illustrates the trimmer head 25 in a normal operating state, and FIG. 2B illustrates the trimmer head 25 during a bump. As shown in FIGS. 2A and 2B, the trimmer head 25 may include a trimmer head housing 100 inside which a spool 110 and a coupling assembly 120 are housed. The spool 110 and housing 100 may each be configured to be movable rotationally about an axis 115. However, neither the spool 110 nor the housing 100 may move axially along the axis 115 at any time.

The coupling assembly 120 may be operably coupled to a button 130 (or other movable member) that is outside the housing 100 and is movable in the axial direction (as shown by arrow 140). The button 130 may be fixed to the coupling assembly 120 such that the coupling assembly 120 and the button 130 generally move together axially and rotationally about the axis 115 of the spool 110 and housing 100. Meanwhile, the coupling assembly 120 may be operably coupled to the spool 110 such that the spool 110 and coupling assembly 120 allow relative motion between each other axially (i.e., relative axial motion), but do not allow relative motion between each other rotationally. In particular, the coupling assembly 120 may move axially, while the spool 110 does not move axially, but any rotational movement of the coupling assembly 120 is transferred to and causes corresponding rotational movement of the spool 110. Rotational movement of the trimmer head 25 generally may be provided by drive shaft 150, which may be directly coupled to the housing 100 so that any rotational movement of the drive shaft 150 causes corresponding rotational movement of the housing 100.

The housing 100 may be configured to move (i.e., rotate about the axis 115) whenever trimmer head 25 is under powered operation (e.g., by operation of the trigger 52). However, the spool 110 may be operably coupled to the housing 100 via the coupling assembly 120 to move rotationally in registration with the housing 100 when the trimmer head 25 is in the operational state, but allow relative movement between the housing 100 and the spool 110 when the trimmer head 25 is bumped. Accordingly, the spool 110 and housing 100 may both be axially fixed in their locations relative to the drive housing 28 (see FIG. 1), but enabled to move rotationally about the axis 115. The coupling assembly 120 may be configured to selectively engage the housing 100 to transfer rotational movement of the housing 100 to the spool 110, when the coupling assembly 120 is engaged to the housing 100. Thus, when the coupling assembly 120 is disengaged from the housing 100, the coupling assembly 120 may not transfer rotational movement of the housing 100 to the spool 110 so that the spool 110 either slows or stops relative to the housing 100. The button 130 may be the mechanism by which the coupling assembly 120 switches between engaging (e.g., rotationally coupling) the housing 100 to the spool 110 and disengaging (e.g., rotationally decoupling) the spool 110 from the housing 100.

As shown in FIG. 2A, when the trimmer head 25 is operating normally (i.e., in the normal operating state), the coupling assembly 120 may be biased into contact with the housing 100 to transfer rotational movement of the housing 100 to the spool 110. However, when the button 130 is actuated (in the direction of arrow 140) as shown in FIG. 2B, the movement of the button 130 in the axial direction shown by arrow 140 carries the coupling assembly 120 upward (in sliding contact with the spool 110), but out of contact with the housing 100 to maintain the spool 110 and coupling assembly 120 in registration with each other, while decoupling the spool 110 from the housing 100. The spool 110 then slows relative to the housing 100, which continues to turn at about the same speed the housing 100 turned before the decoupling.

As can be appreciated from FIGS. 2A and 2B, the spool 110 and housing 100 are indirectly coupled via the coupling assembly 120. The coupling assembly 120 is movable relative to the spool 110 in the axial direction while making sliding contact with the spool 110 during such movement. However, the coupling assembly 120 is not movable relative to the spool 110 rotationally. Instead, the coupling assembly 120 and the spool 110 are rotationally fixed so that the coupling assembly 120 and spool 110 maintain the same alignment relative to each other (i.e., are in registration with each other) rotationally regardless of the axial position of the coupling assembly 120 relative to the spool 110. In other words, the coupling assembly 120 is fixed to the spool 110 relative to rotational movement, but is movable axially relative to the spool. Meanwhile, the axial movement of the coupling assembly 120 alternately holds and releases (i.e., couples and decouples) the spool 110 relative to the housing 100 for rotational movement (while both do not move axially). In this regard, when the coupling assembly 120 moves axially in a direction away from the spool 110, the coupling assembly 120 couples the spool 110 to the housing 100 to hold the spool 110 in registration with the housing 100 to transfer rotational movement of the housing 100 to the spool 110 (via the coupling assembly 120). However, when the coupling assembly 120 moves axially in a direction toward the spool 110 (as shown by arrow 140), the coupling assembly 120 decouples the spool 110 from the housing 100 to enable the spool 110 to lose registration with the housing 100 and experience relative movement with respect to the housing 100.

Figure 3:
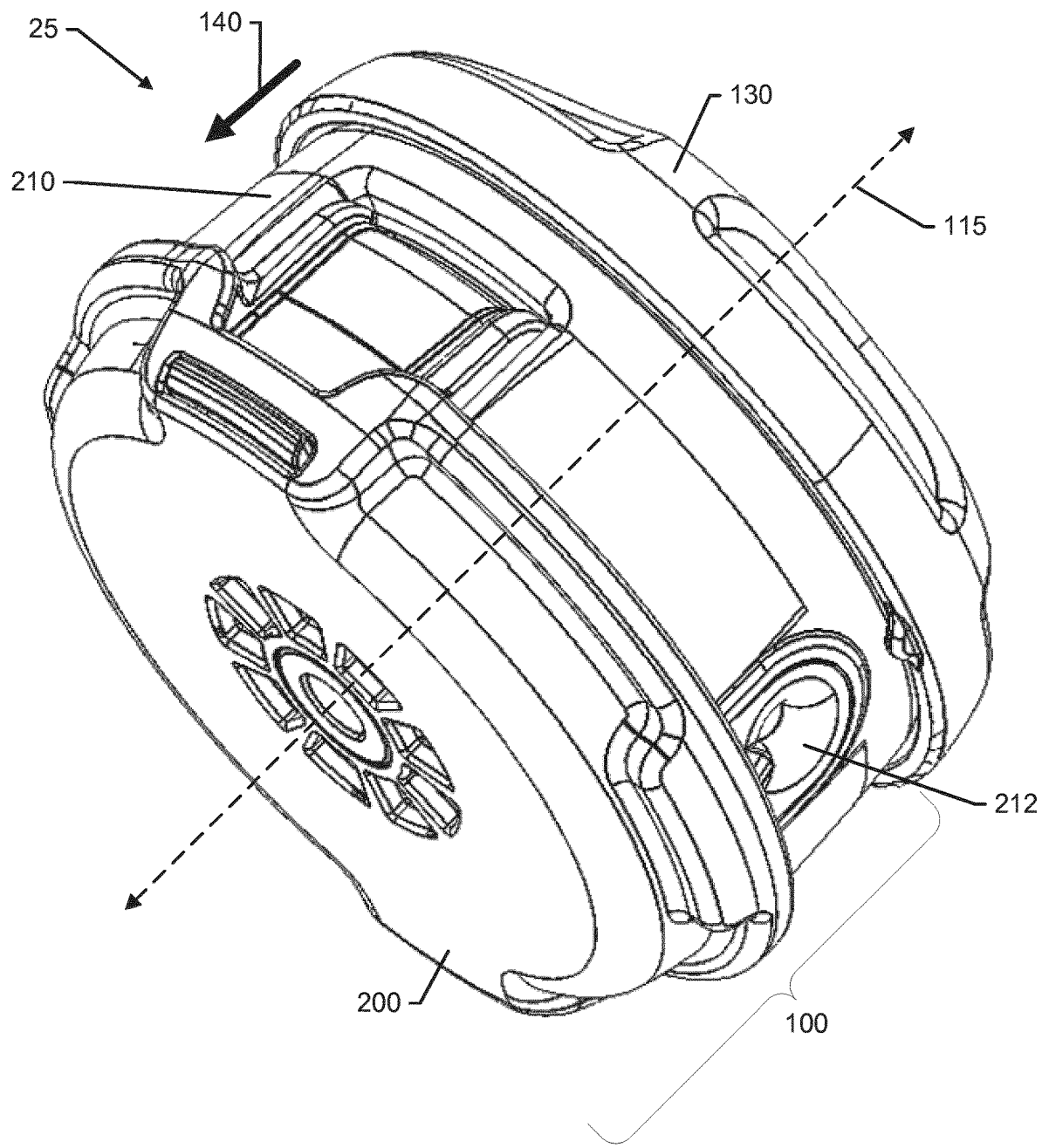
FIG. 3 illustrates a perspective view of the trimmer head fully assembled from a top perspective in accordance with an example embodiment.

The basic operations and interactions of components described above in reference to FIG. 2 can be accomplished via a number of different specific structures and arrangements. Some examples of one such structure and arrangement will now be described in reference to the following figures. In this regard, FIG. 3 illustrates a perspective view of the trimmer head 25 of an example embodiment. The perspective shown in FIG. 3 is of the top of the trimmer head 25 (in reference to the normal position of the trimmer head 25 during operation). Meanwhile, FIGS. 4A and 4B illustrate exploded views of the trimmer head 25 from top (FIG. 4A) and bottom (FIG. 4B) perspectives.

Figure 4A:
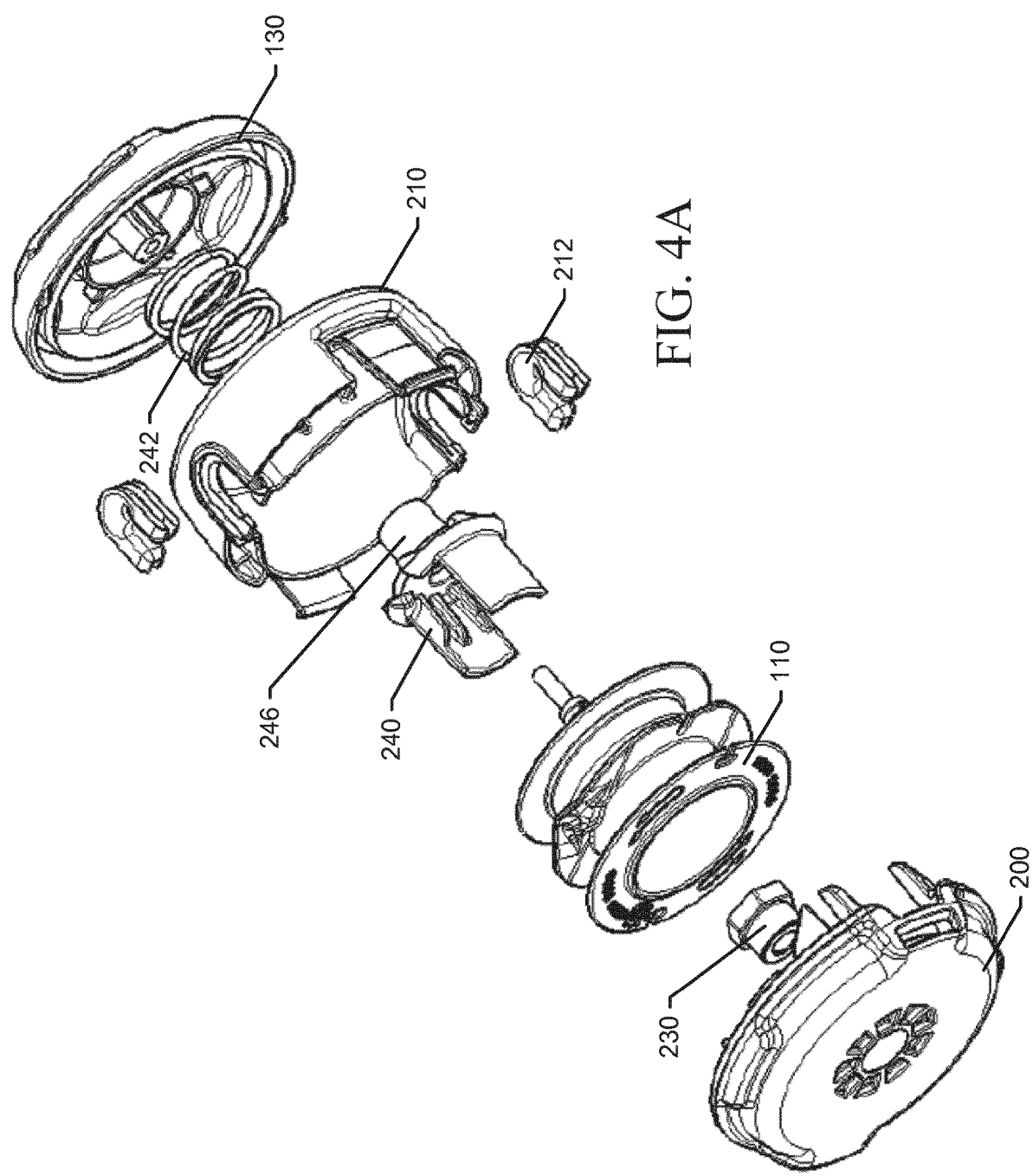
FIG. 4A illustrates an exploded perspective view of the trimmer head configured in accordance with an example embodiment from above.
Figure 4B:
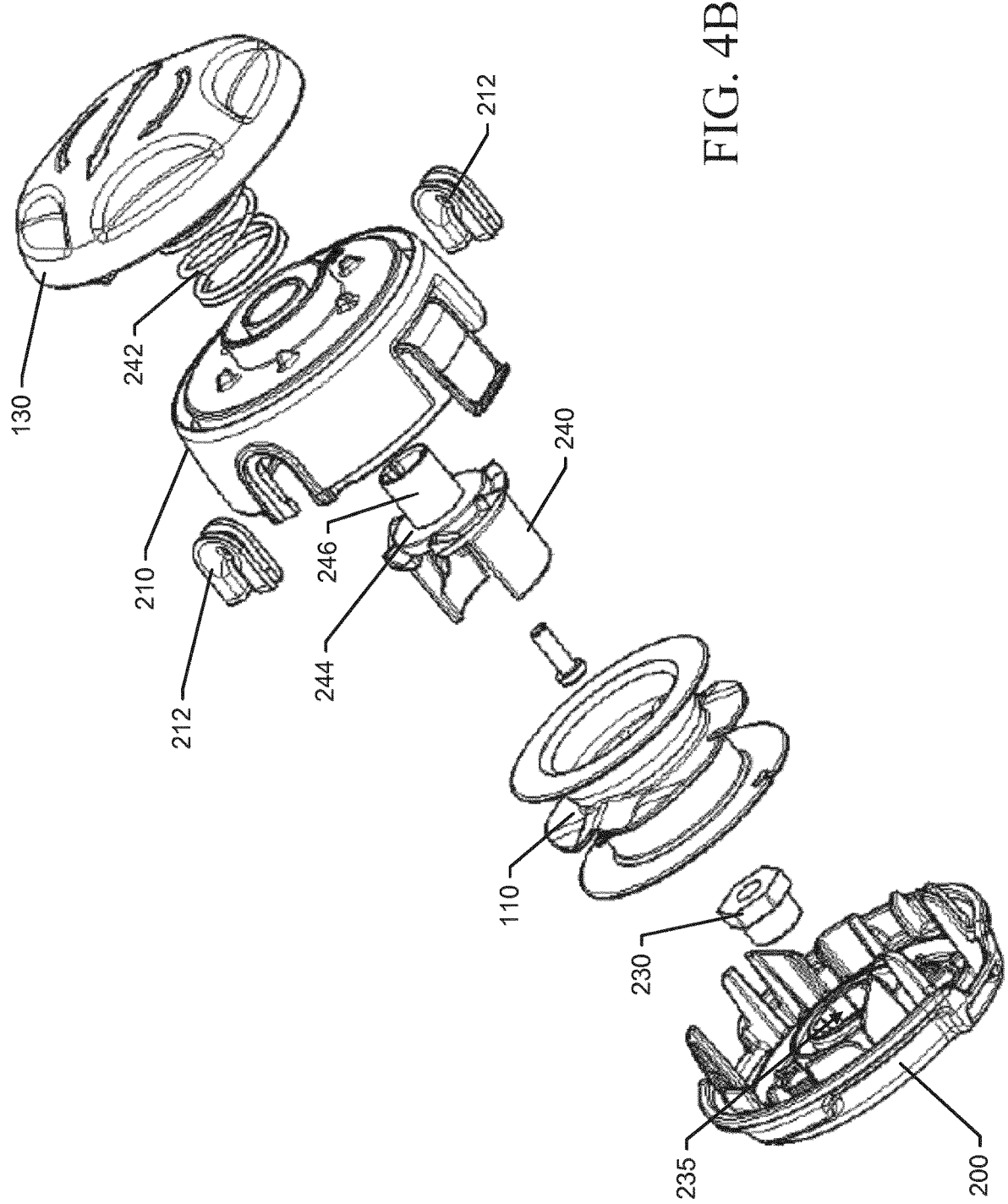
FIG. 4B illustrates an exploded perspective view of the trimmer head configured in accordance with an example embodiment from below.

Referring primarily to FIGS. 3, 4A and 4B, the trimmer head 25 is rotated at a relatively high number of revolutions per minute (RPM) and has string or line (e.g., trimmer line 70 of FIG. 1), which is durable and flexible, extending from opposing sides thereof to cut vegetation encountered by the string or line. The trimmer head 25 is operably coupled to the drive housing 28 (see FIG. 1) inside which the components used to rotate the trimmer head 25 are housed. Below the drive housing 28 (or at a bottom portion thereof) a gearbox arbor may be provided to operably couple the drive shaft 150 of the trimmer 10 to the housing 100 of the trimmer head 25. The housing 100 may be directly coupled to the gearbox arbor and/or the drive shaft 150 of the trimmer 10 so that any movement of the drive shaft 150 is directly coupled to the housing 100 as described above.

Figure 5:
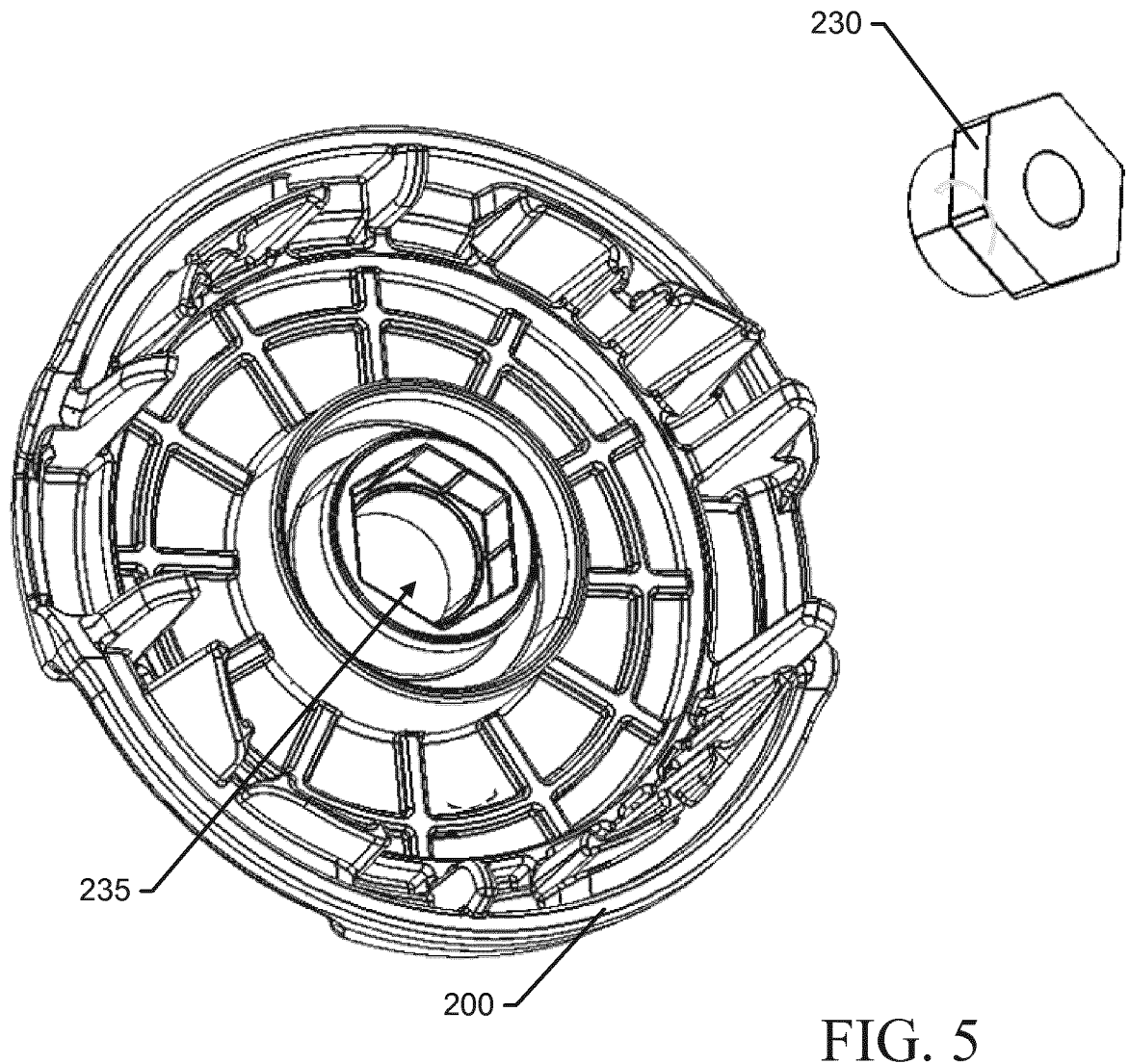
FIG. 5 illustrates a perspective view of a cover an nut of the trimmer head in accordance with an example embodiment.

The housing 100 may include a cover 200 that is snap fit (or otherwise joined) with a cup 210 to form a rotatable unit. Accordingly, it should be appreciated that the housing 100 includes both the cover 200 and the cup 210 in their assembled state such that the cover 200 and the cup 210 are effectively one combined component (i.e., the housing 100) after they are assembled. The housing 100 is rotatably mounted below the drive housing 28 to the gearbox arbor of the trimmer head 25 by a nut 230. The nut 230 may be fit into a corresponding receiving portion 235 of the cover 200 such that housing rotates about a vertical axis (i.e., axis 115) whenever drive power is provided by the trimmer head 25. FIG. 5 illustrates an exploded view of the nut 230 and cover 200, to illustrate how the nut 230 fits into the receiving portion 235. As can be appreciated from FIG. 5, the nut 230 may have a particular shape (e.g., hexagonal), and the receiving portion 235 may be correspondingly shaped (e.g., hexagonal) to provide a tight fit with the nut 230 when the nut 230 is received therein.

As can be appreciated from FIGS. 3-5 and the descriptions provided above, the housing 100 and the spool 110 do not move or translate along the axis 115 at any time during operation. Thus, when the cup 210 and cover 200 are mated with each other (e.g., via snap fit or any other joining method), the spool 110 is retained in a fixed axial position between the cup 210 and the cover 200. However, below the cup 210, a movable member or operator (e.g., button 130) is operably coupled thereto. As discussed in greater detail below, the button 130 moves axially to allow trimmer line 70 to be paid out or fed out of the spool 110 disposed within the housing 100. The coupling assembly 120 is also retained substantially between the cup 210 and cover 200 (although a portion of the coupling assembly 120 passes through the cup 210 to engage the button 130). As discussed above, the coupling assembly 120 selectively couples the housing 100 to the spool 110 for rotational movement based on the axial position of the coupling assembly 120. The interaction between the coupling assembly 120 and the spool 110 and housing 100 (particularly the cup 210) will be described in greater detail below.

Figure 6B:
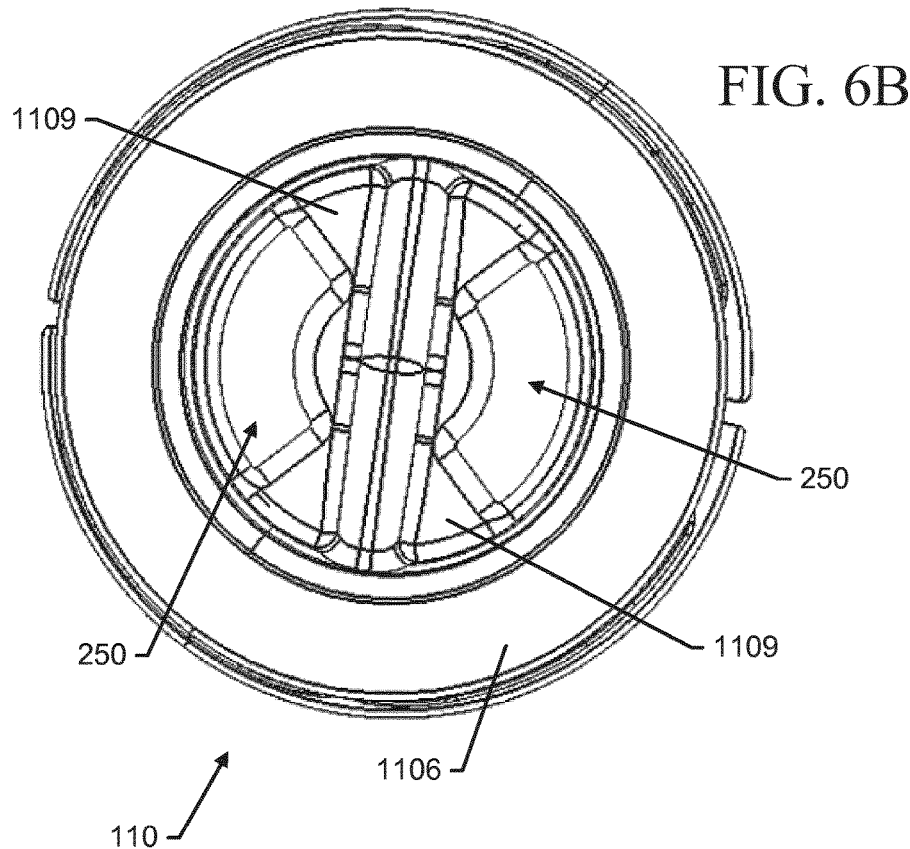
FIG. 6B is a bottom view of the spool in accordance with an example embodiment.
Figure 6A:
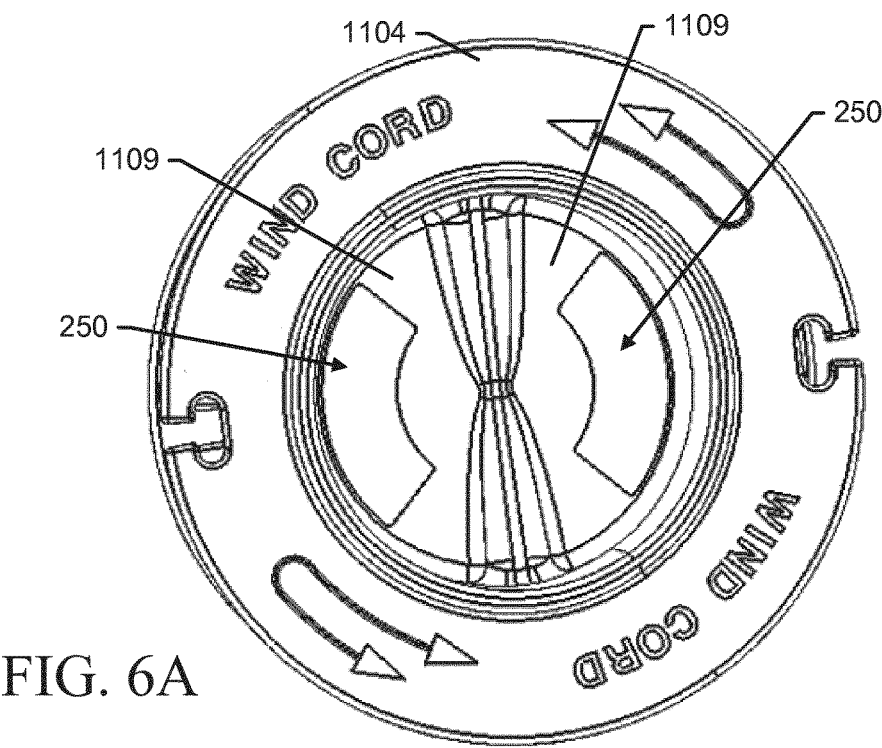
FIG. 6A is a top view of a spool of the trimmer head in accordance with an example embodiment.
Figure 6C:
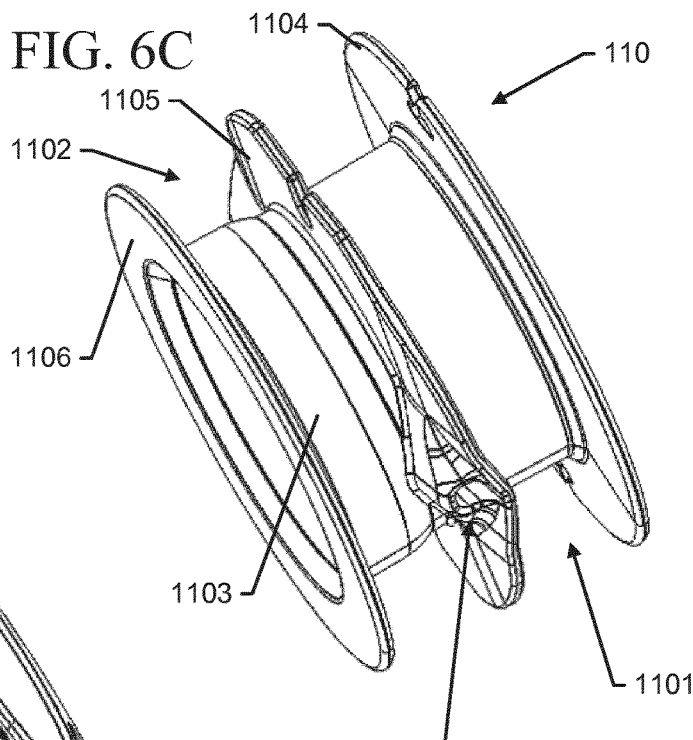
FIG. 6C is a bottom perspective view of the spool in accordance with an example embodiment.
Figure 6D:
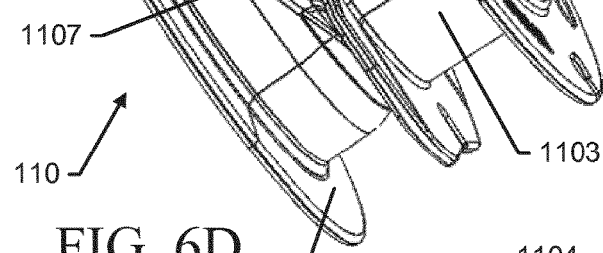
FIG. 6D is a top perspective view of the spool in accordance with an example embodiment.

The spool 110 is shown in greater detail in FIG. 6, which is defined by the various views shown in FIGS. 6A, 6B, 6C, 6D, and 6E. In this regard, FIG. 6A is a top view of the spool 110 and FIG. 6B is a bottom view of the spool 110. FIGS.

Figure 6E:
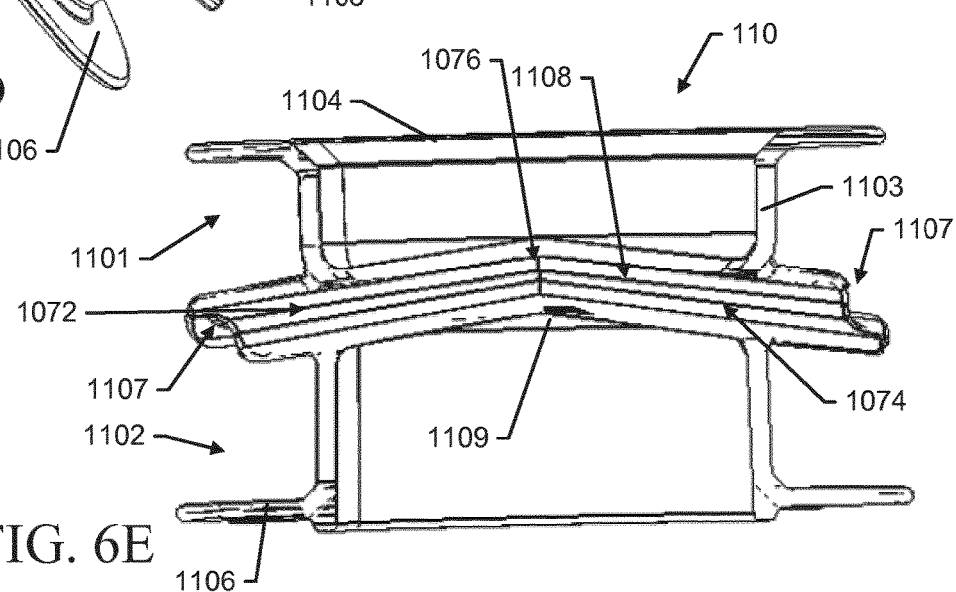
FIG. 6E is a cross section view of the spool in accordance with an example embodiment.
Figure 7:
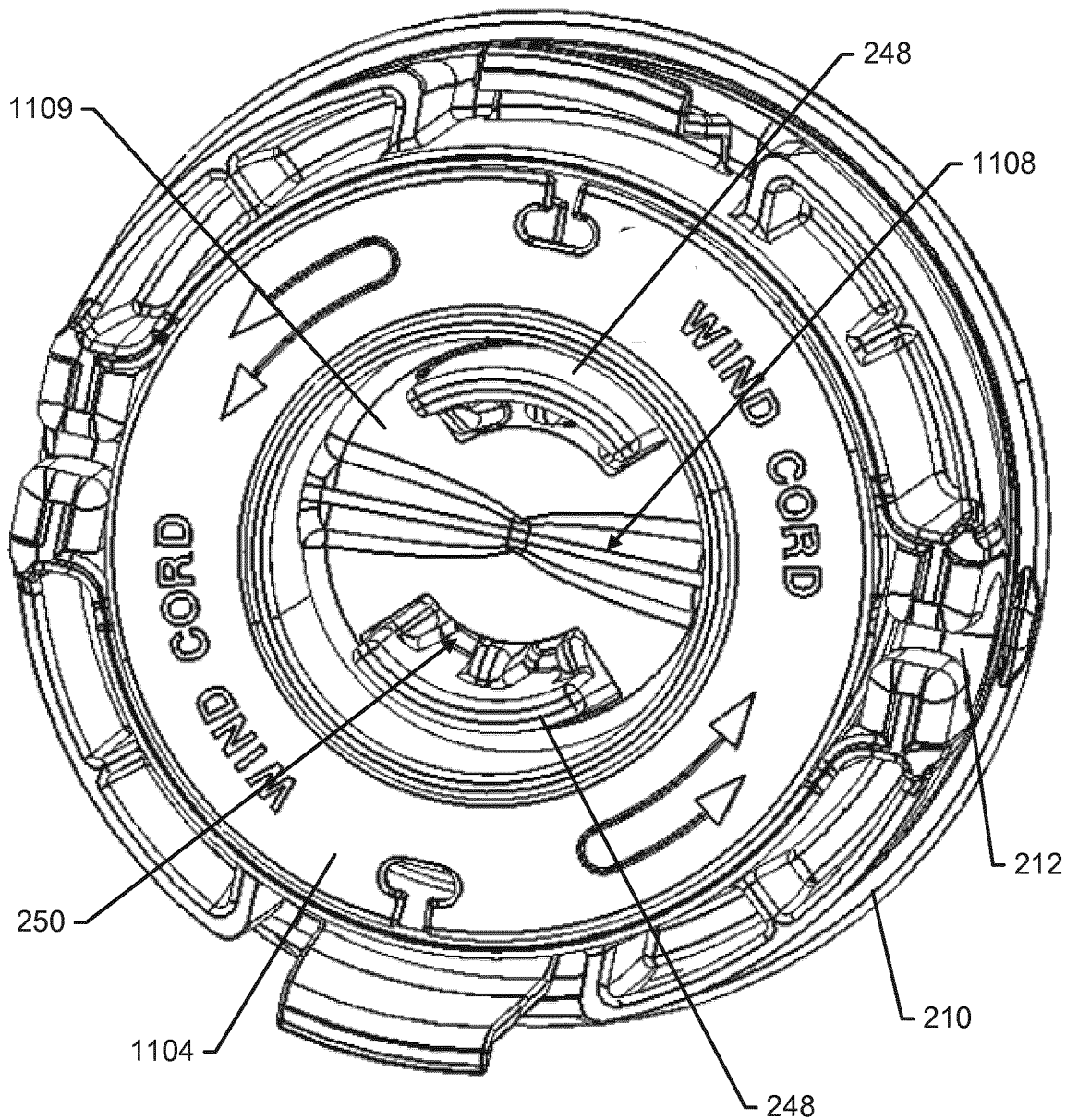
FIG. 7 illustrates a top view of the spool disposed in the cup in accordance with an example embodiment.
Figure 10:
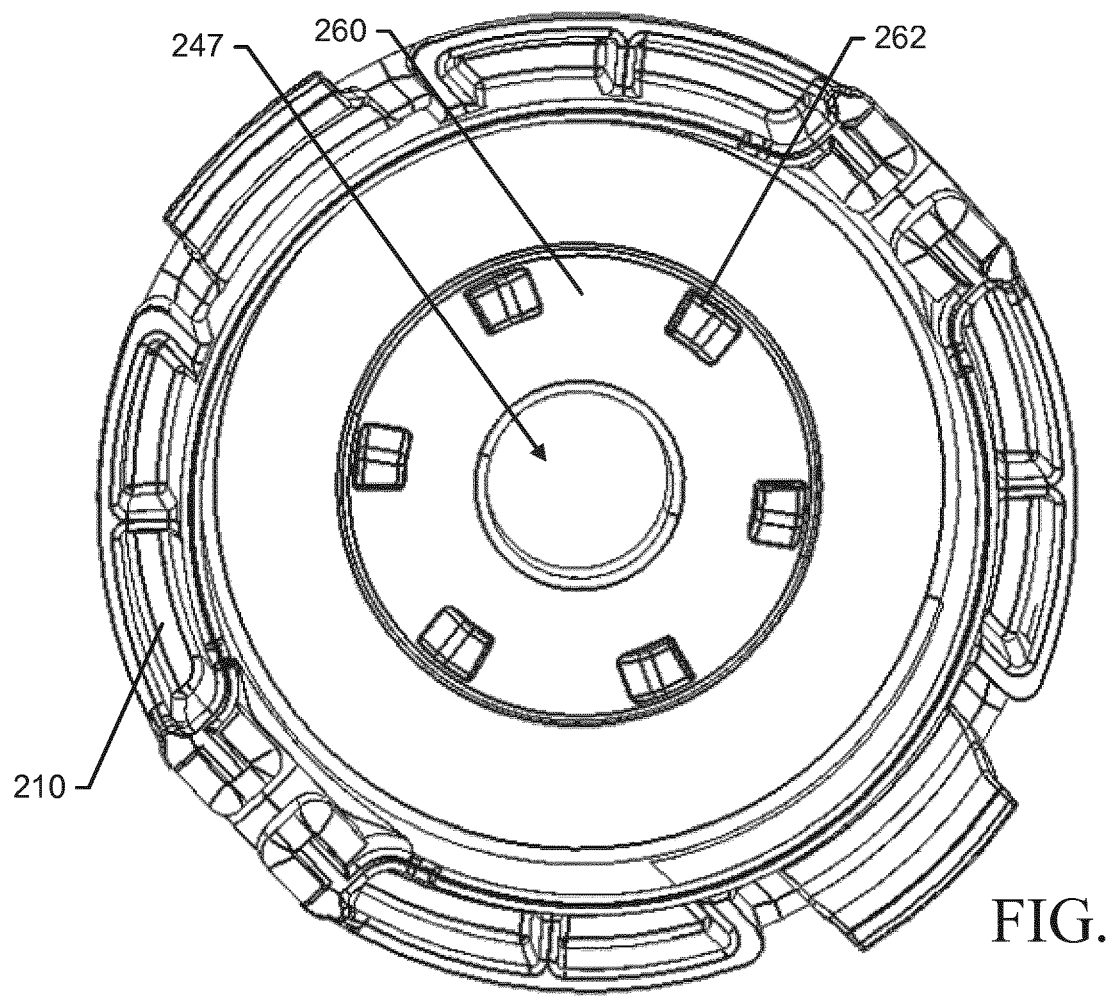
FIG. 10 illustrates a top view of the cup in isolation in accordance with an example embodiment.
Figure 11:
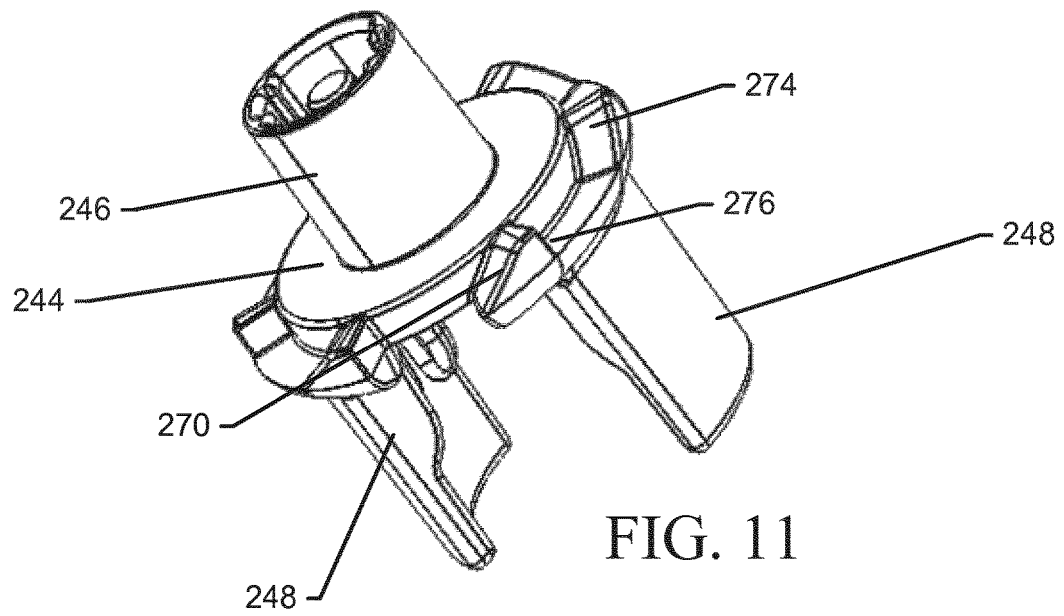
FIG. 11 illustrates a forked driver of the coupling assembly in isolation in accordance with an example embodiment.
Figure 12:
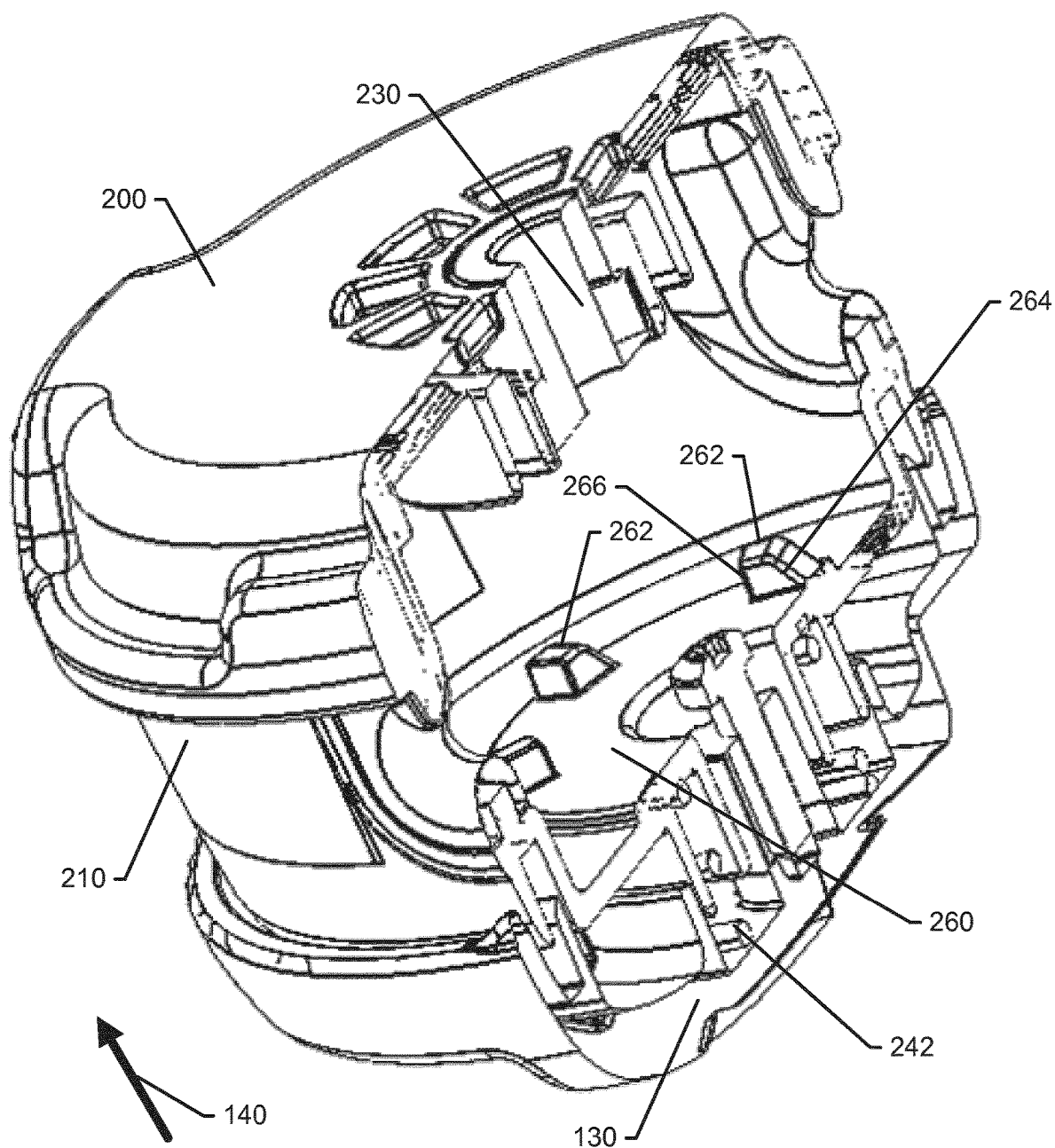
FIG. 12 illustrates a perspective view of a cross section of the cup, cover and button in isolation in accordance with an example embodiment.
Figure 13:
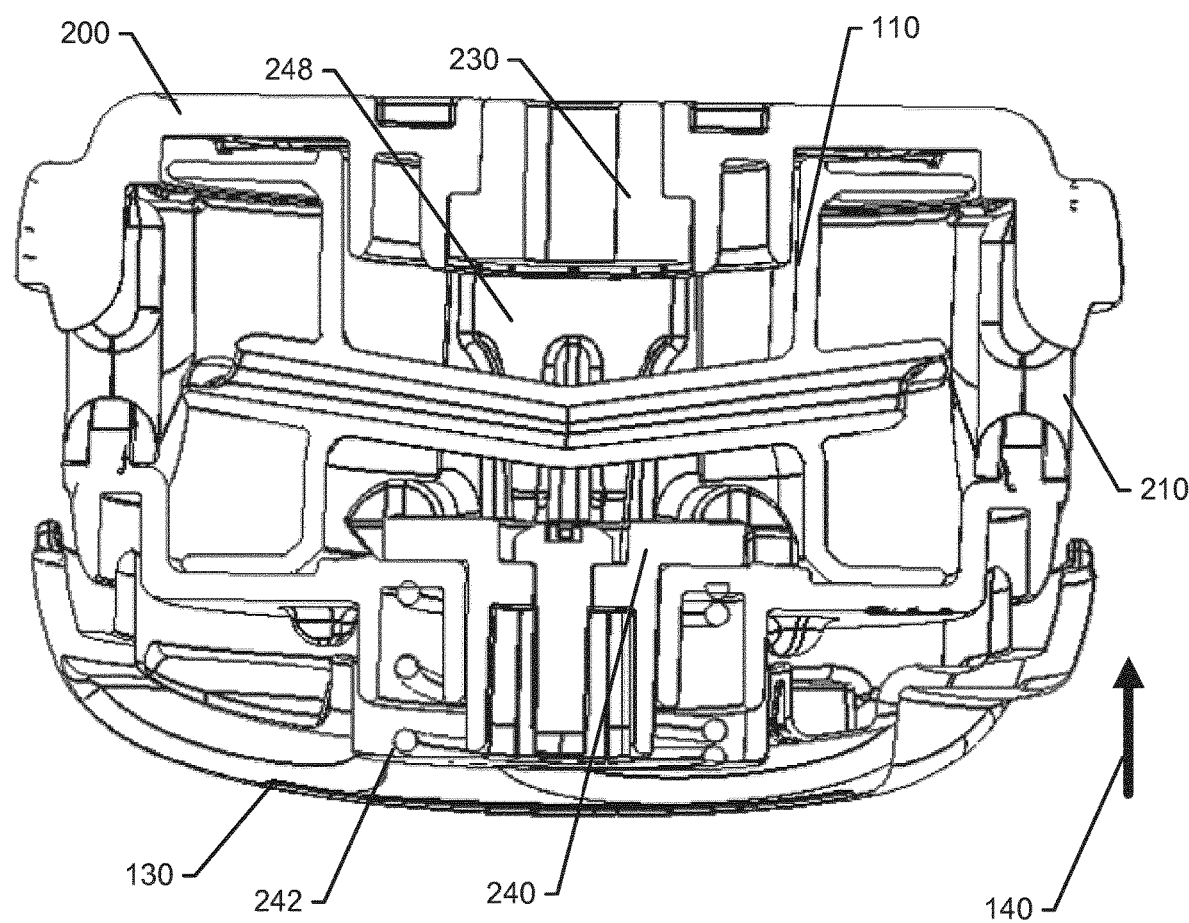
FIG. 13 illustrates a cross section view of the fully assembled trimmer head in accordance with an example embodiment.

6C and 6D are perspective views of the spool 110, and FIG. 6E is a cross section view of the spool 110 in accordance with an example embodiment. FIG. 7 illustrates a top view of the spool 110 disposed in the cup 210. FIG. 8A illustrates an exploded view of the spool 110 and coupling assembly 120 in isolation, and FIG. 8B illustrates a perspective view of the spool 110 and coupling assembly 120 in isolation, but assembled together. FIG. 9 illustrates an exploded perspective view of the spool 110, the coupling assembly 120 and the cup 210. However, in the exploded view of FIG. 9, the coupling assembly 120 is moved on the opposite side of the cup 210 relative to the spool 110, which is not the way the parts are actually arranged when assembled. Thus, it should be appreciated that the coupling assembly 120 is merely shown in this location to facilitate visibility of the coupling assembly 120 for this particular view. FIG. 10 illustrates a top view of the cup 210 in isolation, and FIG. 11 illustrates a forked driver 240 of the coupling assembly 120 in isolation. FIG. 12 illustrates a perspective view of a cross section of the cup 210, cover 200 and button 130 in isolation. FIG. 13 illustrates a cross section view of the fully assembled trimmer head 25 in accordance with an example embodiment.

The spool 110 may be disposed inside the housing 100 (between the cup 210 and the cover 200) and is configured to selectively rotate about the axis 115 with the housing 100. In this regard, the housing 100 rotates whenever drive power is provided, but the spool 110 only rotates when the button 130 is in its rest state (i.e., not axially displaced in the direction of arrow 140) due to the operation of the coupling assembly 120. The spool 110 is configured to allow the string or trimmer line 70 to be stored thereon and subsequently be released or paid out when the button 130 is depressed from its rest state (i.e., bumped) such that the button 130 is axially displaced in the upward direction shown by arrow 140. The string or trimmer line 70 is paid out through eyelets 212 formed or otherwise provided in opposing sides of the cup 210.

As shown in FIG. 6, which is defined by FIGS. 6A, 6B, 6C, 6D and 6E, the spool 110 defines an upper line storage area 1101 and a lower line storage area 1102 with three flanges that extend radially outwardly from a hub 1103 of the spool 110. The hub 1103 may be a substantially hollow cylinder that extends coaxially with the axis 115. A top flange 1104 forms the upper boundary for the upper line storage area 1101 and a middle flange 1105 forms the lower boundary for the upper line storage area 1101. Meanwhile, the middle flange 1105 forms the upper boundary for the lower line storage area 1102 and a bottom flange 1106 forms the lower boundary for the lower line storage area 1102. The string or trimmer line 70 may be wound simultaneously into the upper and lower line storage areas 1101 and 1102 after extending out of openings 1107 from a channel 1108 that passes through the spool 110. The channel 1108 may pass from one opening 1107 to the other opening 1107 on the opposite side of the middle flange 1105.

The channel 1108 and the openings 1107 combine to define a guide tube that, as shown in FIGS. 6A-6E, does not include an entire missing side, as is common in typical designs. The guide tube also remains aligned with the eyelets 212 at all times since the design is case (or housing) driven, instead of core driven. As a result, the trimmer line 70 is guided a greater distance by the guide tubes to increase chances of successful loading of trimmer line 70 by limiting the possibility that the line misses the guide tube during line insertion. Example embodiments therefore include a design in which the spool 110 does not have any teeth or coupling features to interface with any winder element. Accordingly, the provision of guide tubes that do not open to the side, and the absence of teeth on the spool create a design with flexibility to support future improvements as well.

In some cases, a plate 1109 may be formed within the hub 1103 to divide the hub 1103 into two hollow cylindrical portions on opposite sides of the plate 1109. The plate 1109 may be substantially coplanar with the middle flange 1105 in some cases, but need not necessarily be coplanar. However, the plate 1109 may lie in a plane that is substantially parallel to the respective planes in which the top flange 1104, middle flange 1105 and bottom flange 1106 lie. The channel 1108 may substantially bisect the plate 1109 in some cases.

The coupling assembly 120 may include a forked driver 240 and a biasing member 242. The forked driver 240 may be provided, along with the spool 110, in the space formed between the cup 210 and the cover 200. The forked driver 240 may include a substantially circular base 244 having a stem 246 that extends through an axial orifice 247 formed in a bottom portion of the cup 210 about the axis 115. The stem 246 may be formed as a hollow, or partially hollow cylinder that extends in a direction away from the cover 200 and toward the button 130. The stem 246 may be operably coupled to the button 130 and, in some cases, a screw may be provided to make such operable coupling rigid.

Of note, regardless of a position of the button 130 and the coupling assembly 120, the spool 110 never translates axially within the housing 100. Thus, the spool 110 either rotates with the coupling assembly 120 in registration with the housing 100 (when the button 130 is in the rest position) or does not rotate in registration with the housing 100 (when the button 130 is depressed or bumped), but the spool 110 otherwise is trapped or supported axially to prevent any axial translation along the vertical axis 115.

The button 130 may be biased toward the rest state by the biasing member 242 (e.g., a helical spring) that pushes the button 130 away from the cup 210. In some cases, the biasing member 242 may be coaxial with the axis 115 and the stem 246 and may extend about the stem 246 and/or the axial orifice 247. The button 130 may be depressed, pushed or otherwise urged out of the rest state by tapping or bumping the button 130 on the ground to overcome the biasing force applied by the biasing member 242 and axially move the button 130 upward in the direction of arrow 140. Due to the operably coupling of the button 130 and the forked driver 240, any axial movement of the button 130 is transferred to the forked driver 240 against the biasing of the biasing member 242. As such, when the button 130 moves axially in the direction of arrow 140, the forked driver 240 moves substantially an equal amount in the same direction.

The forked driver 240 is operably coupled to the spool 110 to transfer rotational movement of the forked driver 240 to the spool 110, but not transfer axial movement of the forked driver 240 to the spool 110. In this regard, the forked driver 240 and the spool 110 are configured to be permanently aligned with each other (i.e., in registration with each other) relative to rotational movement about the axis 115, but are configured to allow relative motion between each other in the axial direction. As such, even though the spool 110 does not move axially, the forked driver 240 can still move axially while, regardless of its axial position, maintaining alignment with the spool 110. To accomplish this arrangement that is permissive of relative axial motion, but not rotational motion, some example embodiments may configure the forked driver 240 to include one or more protrusions configured as knife members 248. Each of the knife members 248 may be formed as a protrusion that extends substantially perpendicularly away from the base 244 and has an arcuate cross section. The knife members 248 may extend through correspondingly shaped knife receptors 250 formed in the plate 1109.

The knife members 248 may fit into the knife receptors 250 in such a way as to allow axial motion of the knife members 248 within the knife receptors 250. However, any rotational movement of the knife members 248 necessarily causes corresponding movement of the spool 110 due to a relatively tight fit between the knife members 248 and the knife receptors 250. In some cases, the knife members 248 may be configured to slidingly engage sides of the knife receptors 250 during axial movement of the knife members 248. Meanwhile, the stem 246 of the forked driver 240 passes through the axial orifice 247, which is formed in a flat bottom portion (or base plate 260) of the cup 210 to engage the button 130. When the button 130 moves axially, the axial movement is transferred directly to the stem 246 and therefore also moves the forked driver 240 axially with the button 130.

As best seen in FIGS. 10 and 12, the base plate 260 of the cup 210 may be provided with an annular array of protrusions 262 that extend substantially perpendicularly upward and away from the base plate 260 of the cup 210. Each of the protrusions 262 may include an angled face 264 and a perpendicular face 266. The angled faces 264 of the protrusions 262 may all be facing the same (i.e., first) direction, and the perpendicular faces 266 of the protrusions 262 may also all be facing the same direction (i.e., a second direction that is substantially opposite the first direction). The sloped faces 264 may be formed at an angle of about 45 degrees relative to the base plate 260. However, any other suitable angle (typically between 20 and 70 degrees) could be employed. Meanwhile, the perpendicular faces 266 may be formed substantially at a right angle relative to the base plate 260.

The forked driver 240 may include the base 244 from which the knife members 248 extend. The base 244 may also include, on a side thereof that is opposite the side from which the knife members 248 protrude, an annular array projections 270 that correspond to the protrusions 262 on the base plate 260 of the cup 210. The base plate 260 of the cup 210 and the base 244 of the forked driver 240 may lie in parallel planes and be shaped similarly (e.g., circular). The planes in which the base 244 and the base plate 260 lie may each be substantially perpendicular to the axis 115. The projections 270 may be shaped to be complementary to the protrusions 262. Thus, for example, the projections 270 may have a sloped face 274 that complements the angled face 264 of each of the protrusions 262 on the base plate 260 of the cup 210. The projections 270 may each also have a perpendicular face 276 to complement the perpendicular face 266 of a respective one of the protrusions 262. The projections 270 may each be spaced apart from each other by a space substantially equal to the space that separates each of the protrusions 262. Heights of the projections 270 and protrusions 262 may be substantially equal. Thus, the protrusions 262 may contact the base 244 of the forked driver 240 and the projections 270 may also contact the base plate 260 of the cup 210 when the button 130 is in the rest position.

When the button 130 is in the rest position, the biasing member 242 may push the button 130 away from the base plate 260 of the cup 210 and draw the base 244 of the forked driver 240 toward the base plate 260 of the cup 210. The projections 270 and protrusions 262 need not necessarily be in contact with each other if there is no powered operation at this point (i.e., they could each lie in the spaces between the other), but contact is possible between the projections 270 and protrusions 262 even when powered operation is not conducted. However, during powered operation of the trimmer 10, the housing 100 will be rotated in a cutting direction and the perpendicular faces 266 and 276 of the protrusions 262 and the projections 270 may abut against each other. The rotation of the housing 100 will then be transferred directly to the forked driver 240 via the contact between the perpendicular faces 266 and 276 of the protrusions 262 and the projections 270. Accordingly, since the knife members 248 extend through the knife receptors 250, the motion of the forked driver 240 will also be transferred directly to the spool 110. In this way, motion of the housing 100 is transferred to the spool 110 while the button 130 is in the rest position.

String or trimmer line 70 may be wound onto the spool 110 manually by rotation of the spool 110 in a winding direction that is the same as the cutting direction. To accomplish the loading, string or trimmer line 70 may be passed through the channel 1108 and then the button 130 may be rotated in the winding direction. Since the button 130 is fixed to the stem 246 of the forked driver 240, the forked driver 240 may be carried also in the winding direction. The angled faces 264 of the protrusions 262 may be allowed to ride along the sloped faces 274 of the projections 270 until a set of the projections 270 and protrusions 262 that contact each other are enabled to slide fully past each other until a next set contact each other. The motion of the forked driver 240 is then translated to corresponding motion of the spool 110, independent of motion of the housing 100) in the winding direction to load the string or trimmer line 70. This process can be repeated in the winding direction until the string or trimmer line 70 is loaded onto the spool 110 to the desired degree. Accordingly, the projections 270 and protrusions 262 can be seen to work together to facilitate transfer of motion from the housing 100 to the spool 110 during powered operation while the button 130 is in the rest state, but allow movement of the spool 110 independent of the housing 100 to load string or trimmer line 70 when the trimmer 10 is not in powered operation.

Powered operation during a bump, however, will displace the forked driver 240 axially (in the direction of arrow 140), while the spool 110 and the cup 210 do not move axially. Thus, the protrusions 262 and projections 270 will be taken out of contact with each other through axial displacement away from each other to prevent rotational motion of the housing 100 from being transferred to the spool 110. In this regard, when the button 130 is displaced in the direction of arrow 140, the forked driver 240 will move axially in the same direction by substantially the same amount as the bump will overcome the biasing force of the biasing member 242. The knife members 248 will slide axially within the knife receptors 250 during the axial movement of the forked driver 240 such that the base 244 will move away from the base plate 260 taking the projections 270 out of contact with the protrusions 262. Not only will the continued movement of the housing 100 (due to powered operation of the trimmer 10) no longer be transferred to the forked driver 240, but the spool 110 (and forked driver 240) will be allowed to slow or even stop rotating since they are no longer carried with the housing 100. The relative motion between the housing 100 (which continues to move at normal operating speed) and the spool 110 (which slows relative to the housing 100 or stops) occurs in an unwinding direction (opposite the winding direction) relative to the housing 100. The movement of the spool 110 in the unwinding direction relative to the housing 100 effectively peels string or trimmer line 70 off the spool 110 to lengthen the effective length of the string or trimmer line 70 by paying out the string or trimmer line 70 through the eyelets 212.

FIG. 6E shows a cross section view of the spool 110 to facilitate an understanding of the channel 1108 formed through the spool 110. The gearbox arbor (i.e., the drive shaft onto which the trimmer head 25 is bolted), extends downward and into the trimmer head 25. Moreover, the gearbox arbor extends far enough downward that it is not possible to pass a channel directly through the spool 110. As such, the gearbox arbor forms an obstruction around which the channel 1108 must pass.

To avoid the obstruction provided by the gearbox arbor, the channel 1108 includes a first angled passage 1072 and a second angled passage 1074 that meet at an apex 1076. The first angled passage 1072 extends from opening 1107 at an angle relative to a horizontal plane downward to the apex 1076. The second angled passage 1074 also extends from the opposite opening 1107 of the spool 110 at an angle relative to the horizontal plane downward to the apex 1076 where the first angled passage 1072 and second angled passage 1074 intersect each other. By providing the channel with the V shape, the gearbox arbor can be avoided while still allowing alignment of the openings 1107 with the eyelets 212 for feeding string or trimmer line 70 through the channel to load string or line onto the spool 110. The spool 110 can therefore freely rotate when the button 130 is in the rest state, and slow down or be held in place so that it does not move (while the housing 100 continues to move) when the button 130 is depressed to allow the string or trimmer line 70 to be paid out.

Thus, the operation of the spool 110 relative to transitioning between being driven to rotate or being stationary within the housing 100 while the housing 100 rotates is controlled by the forked driver 240 of the coupling assembly 120. The hub 1103 of the spool 110 is configured to mate with the forked driver 240 in a way that ensures that the spool 110 rotates whenever the forked driver 240 is driven, but allows the forked driver 240 and spool 110 to slow relative to the housing 100 when the forked driver 240 is no longer fixed in registration with the housing 100. The forked driver 1060 includes two knife members 1062 that extend through slots formed in a hub plate 1070 formed at an axial center portion of the spool 110. The forked driver 1060 is operably coupled to the button 130 and moves axially with the button 130. Due to the biasing force provided by biasing spring 1042, the forked driver 1060 is generally biased downward and toward contact with a bottom portion of the cup 210.

In accordance with an example embodiment, a hand-held cutting device is provided. The device may include an elongated member graspable along a portion thereof by an operator, a trimmer head disposed at one end of the elongated member and configured to be rotatable to perform a cutting function using trimmer line held at a portion of the trimmer head, and a power unit operably coupled to the trimmer head to selectively cause rotation of the trimmer head via turning a shaft. The trimmer head may include a spool onto which trimmer line is loadable and from which the trimmer line is dispensable, a housing including a first housing portion and a second housing portion operably coupled to the first housing portion to house the spool where the housing is driven rotationally about an axis by a shaft during powered operation of the device, a coupling assembly configured to selectively couple the spool to and decouple the spool from the housing during powered operation of the device based on an axial position of the coupling assembly within the housing, and a button operably coupled to the coupling assembly to alter the axial position of the coupling assembly when the button is moved out of a rest position by a bump of the button on a surface.

The device or trimmer head of some embodiments may include additional features or modifications to the features described above that may be optionally added in any combination. For example, in some embodiments, (1) the coupling assembly may be configured to prevent relative motion between the spool and the housing when the button is in the rest position during powered operation of the device, and enable relative motion between the spool and the housing when the button is displaced from the rest position. In an example embodiment, (2) the coupling assembly may include a driver and a biasing member. The biasing member may be disposed between the second housing portion and the button to bias the button toward the rest position. In some embodiments, (3) the second housing portion may include an axial orifice through which a stem of the driver passes to operably couple the driver to the button. In some cases, (4) the second housing portion may include a base plate that extends substantially perpendicular to the axis. The driver may include a base that lies in a plane parallel to a plane in which the base plate lies. In an exemplary embodiment, (5) the base plate may include a plurality of protrusions extending away from a surface of the base plate toward the first housing portion. The base may include a plurality of projections extending toward the base plate, and the projections and protrusions may interact with each other to transfer movement of the housing to the driver responsive to the button being in the rest position during powered operation of the trimmer, and may interact with each other to enable loading the trimmer line onto the spool by manual rotation of the spool and driver via the button when the trimmer is not powered. In some embodiments, (6) each of the projections may include a sloped face configured to face a corresponding and complementary angled face of the protrusions to enable the manual rotation of the spool and driver via the button when the trimmer is not powered. In some examples, (7) each of the projections may include a perpendicular face configured to face a corresponding perpendicular face of the protrusions to transfer rotation of the housing to the spool via the driver during powered operation of the trimmer.

In some embodiments, any or all of (1) to (7) may be employed in addition to the optional modifications or augmentations described below. For example, in some embodiments, the spool may include a plate extending substantially perpendicular to the axis between sidewalls of a hub of the spool, and wherein one or more knife receptors are disposed in the plate to enable a corresponding one or more knife members of the driver to pass therethrough. Alternatively or additionally, the knife members may slidingly engage the knife receptors to enable the driver to maintain a rotational alignment with the spool regardless of an axial position of the driver relative to the spool. Alternatively or additionally, the spool and the housing may not move axially, and the coupling assembly may be in contact with the housing and spool to maintain rotational alignment between the housing and the spool when the button is in the rest position during powered operation of the trimmer. The coupling assembly may enable relative rotational motion between the spool and the housing when the button is displaced from the rest position. Alternatively or additionally, the relative rotational motion between the spool and the housing may move the spool in an unwinding direction relative to the housing to dispense the trimmer line from the spool.

EXAMPLES

The following exemplary embodiments may facilitate understanding the present disclosure:

1. A hand-held cutting device comprising:
   an elongated member graspable along a portion thereof by an operator;
   a trimmer head disposed at one end of the elongated member and configured to be rotatable to perform a cutting function using trimmer line that extends from the trimmer head; and
   a power unit operably coupled to the trimmer head to selectively cause rotation of the trimmer head via turning a shaft that defines an axis of the trimmer head during powered operation of the device,
   wherein the trimmer head comprises:
   a spool onto which the trimmer line is loadable and from which the trimmer line is dispensable;
   a housing including a first housing portion and a second housing portion operably coupled to the first housing portion to house the spool, the housing being driven by the shaft during powered operation of the device;
   a coupling assembly configured to selectively couple the spool to and decouple the spool from the housing during powered operation of the device based on an axial position of the coupling assembly within the housing; and
   a button operably coupled to the coupling assembly to alter the axial position of the coupling assembly when the button is moved out of a rest position by a bump of the button on a surface.

2. The device of example 1, wherein the coupling assembly is configured to prevent relative motion between the spool and the housing when the button is in the rest position during powered operation of the device, and enable relative motion between the spool and the housing when the button is displaced from the rest position.

3. The device of example 2, wherein the coupling assembly comprises a driver and a biasing member, wherein the biasing member is disposed between the second housing portion and the button to bias the button toward the rest position.

4. The device of example 3, wherein the second housing portion comprises an axial orifice through which a stem of the driver passes to operably couple the driver to the button.

5. The device of example 3 or 4, wherein the second housing portion comprises a base plate that extends substantially perpendicular to the axis, and wherein the driver comprises a base that lies in a plane parallel to a plane in which the base plate lies.

6. The device of example 5, wherein the base plate comprises a plurality of protrusions extending away from a surface of the base plate toward the first housing portion, wherein the base comprises a plurality of projections extending toward the base plate, and wherein the projections and protrusions interact with each other to transfer movement of the housing to the driver responsive to the button being in the rest position during powered operation of the trimmer, and interact with each other to enable loading the trimmer line onto the spool by manual rotation of the spool and driver via the button when the trimmer is not powered.

7. The device of example 6, wherein each of the projections comprises a sloped face configured to face a corresponding and complementary angled face of the protrusions to enable the manual rotation of the spool and driver via the button when the trimmer is not powered.

8. The device of example 6 or 7, wherein each of the projections comprises a perpendicular face configured to face a corresponding perpendicular face of the protrusions to transfer rotation of the housing to the spool via the driver during powered operation of the trimmer.

9. The device of any of examples 3 to 8, wherein the spool comprises a plate extending substantially perpendicular to the axis between sidewalls of a hub of the spool, and wherein one or more knife receptors are disposed in the plate to enable a corresponding one or more knife members of the driver to pass there through.

10. The device of example 9, wherein the knife members slidingly engage the knife receptors to enable the driver to maintain a rotational alignment with the spool regardless of an axial position of the driver relative to the spool.

11. The device of any preceding example, wherein the spool and the housing do not move axially, and the coupling assembly is in contact with the housing and spool to maintain rotational alignment between the housing and the spool when the button is in the rest position during powered operation of the trimmer, and wherein the coupling assembly enables relative rotational motion between the spool and the housing when the button is displaced from the rest position.

12. The device of example 11, wherein the relative rotational motion between the spool and the housing moves the spool in an unwinding direction relative to the housing to dispense the trimmer line from the spool.

13. A trimmer head of a hand-held cutting device, the trimmer head comprising:
    a spool onto which trimmer line is loadable and from which the trimmer line is dispensable;
    a housing including a first housing portion and a second housing portion operably coupled to the first housing portion to house the spool, the housing being driven rotationally about an axis by a shaft during powered operation of the device;
    a coupling assembly configured to selectively couple the spool to and decouple the spool from the housing during powered operation of the device based on an axial position of the coupling assembly within the housing; and
    a button operably coupled to the coupling assembly to alter the axial position of the coupling assembly when the button is moved out of a rest position by a bump of the button on a surface.

14. The trimmer head of example 13, wherein the coupling assembly is configured to prevent relative motion between the spool and the housing when the button is in the rest position during powered operation of the device, and enable relative motion between the spool and the housing when the button is displaced from the rest position.

15. The trimmer head of example 14, wherein the coupling assembly comprises a driver and a biasing member, wherein the biasing member is disposed between the second housing portion and the button to bias the button toward the rest position.

16. The trimmer head of example 15, wherein the second housing portion comprises an axial orifice through which a stem of the driver passes to operably couple the driver to the button.

17. The trimmer head of example 15 or 16, wherein the second housing portion comprises a base plate that extends substantially perpendicular to the axis, and wherein the driver comprises a base that lies in a plane parallel to a plane in which the base plate lies.

18. The trimmer head of example 17, wherein the base plate comprises a plurality of protrusions extending away from a surface of the base plate toward the first housing portion, wherein the base comprises a plurality of projections extending toward the base plate, and wherein the projections and protrusions interact with each other to transfer movement of the housing to the driver responsive to the button being in the rest position during powered operation of the trimmer, and interact with each other to enable loading the trimmer line onto the spool by manual rotation of the spool and driver via the button when the trimmer is not powered.

19. The trimmer head of example 18, wherein each of the projections comprises a sloped face configured to face a corresponding and complementary angled face of the protrusions to enable the manual rotation of the spool and driver via the button when the trimmer is not powered.

20. The trimmer head of example 18 or 19, wherein each of the projections comprises a perpendicular face configured to face a corresponding perpendicular face of the protrusions to transfer rotation of the housing to the spool via the driver during powered operation of the trimmer.

21. The trimmer head of any of examples 15 to 20, wherein the spool comprises a plate extending substantially perpendicular to the axis between sidewalls of a hub of the spool, and wherein one or more knife receptors are disposed in the plate to enable a corresponding one or more knife members of the driver to pass therethrough.

22. The trimmer head of example 21, wherein the knife members slidingly engage the knife receptors to enable the driver to maintain a rotational alignment with the spool regardless of an axial position of the driver relative to the spool.

23. The trimmer head of any of examples 13-22, wherein the spool and the housing do not move axially, and the coupling assembly is in contact with the housing and spool to maintain rotational alignment between the housing and the spool when the button is in the rest position during powered operation of the trimmer, and wherein the coupling assembly enables relative rotational motion between the spool and the housing when the button is displaced from the rest position.

24. The trimmer head of example 23, wherein the relative rotational motion between the spool and the housing moves the spool in an unwinding direction relative to the housing to dispense the trimmer line from the spool.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A trimmer head for a hand-held cutting device, the trimmer head comprising:
   a spool onto which trimmer line is loadable and from which the trimmer line is dispensable;
   a housing including a first housing portion and a second housing portion operably coupled to the first housing portion to house the spool, the housing being driven rotationally about an axis by a shaft during powered operation of the device;
   a coupling assembly configured to selectively couple the spool to and decouple the spool from the housing during powered operation of the device based on an axial position of the coupling assembly within the housing, the coupling assembly comprising a driver and a biasing member; and
   a button operably coupled to the coupling assembly to alter the axial position of the coupling assembly when the button is moved out of a rest position by a bump of the button on a surface;
   wherein the biasing member is disposed between the second housing portion and the button, and the driver is coupled with the spool such that the driver rotates with the spool;
   wherein the driver is coupled to the button through an axial orifice in the second housing such that the biasing member urges the button into the rest position and the driver into engagement with the second housing.

2. The trimmer head of claim 1, wherein the coupling assembly is configured to prevent relative motion between the spool and the housing when the button is in the rest position during powered operation of the device, and enable relative motion between the spool and the housing when the button is displaced from the rest position.

3. The trimmer head of claim 1, wherein the spool comprises a line channel extending across the axis.

4. The trimmer head of claim 1, wherein the driver is configured to transfer rotational movement to the spool.

5. The trimmer head of claim 4, wherein the driver is axially movable in relation to the spool between a first axial position, in which the driver is rotationally coupled to the housing, and a second axial position, in which the driver is rotationally decoupled from the housing.

6. The trimmer head of claim 4, wherein the driver is in sliding engagement with the spool,
   wherein the driver comprises at least one protrusion offset from the axis, and
   wherein the at least one protrusion rotationally couples the driver to the spool.

7. The trimmer head of claim 4, wherein the driver comprises a pair of protrusions offset from the axis, wherein the pair of drive protrusions straddle the channel.

8. The trimmer head of claim 1,
   wherein a stem of the driver passes through the axial orifice to operably couple the driver to the button.

9. The trimmer head of claim 1, wherein the second housing portion comprises a base plate that extends substantially perpendicular to the axis, and wherein the driver comprises a base that lies in a plane parallel to a plane in which the base plate lies.

10. The trimmer head of claim 1, wherein the spool comprises a plate extending substantially perpendicular to the axis between sidewalls of a hub of the spool, and wherein one or more knife receptors are disposed in the plate to enable a corresponding one or more knife members of the driver to pass therethrough.

11. The trimmer head of claim 10, wherein the knife members slidingly engage the knife receptors to enable the driver to maintain a rotational alignment with the spool regardless of an axial position of the driver relative to the spool.

12. The trimmer head of claim 1, wherein the spool and the housing do not move axially, and the coupling assembly is in contact with the housing and spool to maintain rotational alignment between the housing and the spool when the button is in the rest position during powered operation of the trimmer, and wherein the coupling assembly enables relative rotational motion between the spool and the housing when the button is displaced from the rest position.

13. The trimmer head of claim 12, wherein the relative rotational motion between the spool and the housing moves the spool in an unwinding direction relative to the housing to dispense the trimmer line from the spool.

14. The trimmer head of claim 1, wherein the button has a radial width exceeding a radial width of the axial orifice.

15. The trimmer head of claim 1, wherein the biasing member acts directly upon the button to indirectly urge the driver into engagement with the second housing.

16. The trimmer head of claim 1, wherein a stem of the driver passes through the axial orifice in the second housing and through the biasing member to couple to the button.

17. A trimmer head for a hand-held cutting device, the trimmer head comprising:
  a spool onto which trimmer line is loadable and from which the trimmer line is dispensable;
  a housing including a first housing portion and a second housing portion operably coupled to the first housing portion to house the spool, the housing being driven rotationally about an axis by a shaft during powered operation of the device;
  a coupling assembly configured to selectively couple the spool to and decouple the spool from the housing during powered operation of the device based on an axial position of the coupling assembly within the housing, the coupling assembly comprising a driver and a biasing member; and
  a button operably coupled to the coupling assembly to alter the axial position of the coupling assembly when the button is moved out of a rest position by a bump of the button on a surface,
  wherein the biasing member is disposed between the second housing portion and the button, and the driver is coupled with the spool such that the driver rotates with the spool,
  wherein the driver is coupled to the button through an axial orifice in the second housing such that the biasing member urges the button into the rest position and the driver into engagement with the housing,
  wherein the driver is configured to transfer rotational movement to the spool,
  wherein the second housing portion comprises a base plate that extends substantially perpendicular to the axis, and wherein the driver comprises a base that lies in a plane parallel to a plane in which the base plate lies, and
  wherein the base plate comprises a plurality of protrusions extending away from a surface of the base plate toward the first housing portion, wherein the base comprises a plurality of projections extending toward the base plate, and wherein the projections and protrusions interact with each other to transfer movement of the housing to the driver responsive to the button being in the rest position during powered operation of the trimmer, and interact with each other to enable loading the trimmer line onto the spool by manual rotation of the spool and driver via the button when the trimmer is not powered.

18. The trimmer head of claim 17, wherein each of the projections comprises a sloped face configured to face a corresponding and complementary angled face of the protrusions to enable the manual rotation of the spool and driver via the button when the trimmer is not powered.

19. The trimmer head of claim 17, wherein each of the projections comprises a perpendicular face configured to face a corresponding perpendicular face of the protrusions to transfer rotation of the housing to the spool via the driver during powered operation of the trimmer.

20. A hand-held cutting device comprising:
  an elongated member graspable along a portion thereof by an operator;
  a trimmer head disposed at one end of the elongated member and configured to be rotatable to perform a cutting function using trimmer line that extends from the trimmer head; and
  a power unit operably coupled to the trimmer head to selectively cause rotation of the trimmer head via turning a shaft that defines an axis of the trimmer head during powered operation of the device,
  wherein the trimmer head is a trimmer head as defined in claim 1.

* * * * *